(12) United States Patent
Huang et al.

(10) Patent No.: US 12,079,307 B2
(45) Date of Patent: Sep. 3, 2024

(54) PERSONALIZED DATA MODEL UTILIZING CLOSED DATA

(71) Applicant: GOOGLE LLC, Mountain View, CA (US)

(72) Inventors: Jane Huang, Kirkland, WA (US); Li He, Redmond, WA (US); Ian Porteous, Mercer Island, WA (US)

(73) Assignee: Google LLC, Mountain View, CA (US)

( * ) Notice: Subject to any disclaimer, the term of this patent is extended or adjusted under 35 U.S.C. 154(b) by 825 days.

(21) Appl. No.: 16/971,253

(22) PCT Filed: Nov. 27, 2019

(86) PCT No.: PCT/US2019/063604
§ 371 (c)(1),
(2) Date: Aug. 19, 2020

(87) PCT Pub. No.: WO2021/107948
PCT Pub. Date: Jun. 3, 2021

(65) Prior Publication Data
US 2021/0397892 A1    Dec. 23, 2021

(51) Int. Cl.
*G06F 18/21*    (2023.01)
*G06F 18/211*   (2023.01)
(Continued)

(52) U.S. Cl.
CPC ........ *G06F 18/2148* (2023.01); *G06F 18/211* (2023.01); *G06N 3/045* (2023.01)

(58) Field of Classification Search
CPC .... G06F 18/2148; G06F 18/211; G06N 3/045
See application file for complete search history.

(56) References Cited

U.S. PATENT DOCUMENTS

2012/0054019 A1    3/2012   Kitts et al.
2014/0129632 A1*   5/2014   Sutton ............... G06Q 50/01
                                                      709/204
(Continued)

FOREIGN PATENT DOCUMENTS

CN         110506281          11/2019
KR      10-2016-0030996        3/2016
(Continued)

OTHER PUBLICATIONS

Office Action in European Appln. No. 19833006.0, dated Oct. 20, 2021, 7 pages.
(Continued)

*Primary Examiner* — David E Choi
(74) *Attorney, Agent, or Firm* — Fish & Richardson P.C.

(57) ABSTRACT

Systems, methods and computer-readable storage media utilized to train a machine-learning architecture. One method includes receiving, by one or more processing circuits, a data set. The method further includes determining, by the one or more processing circuits, a first portion of the data set associated with a plurality of entities. The method further includes training, by the one or more processing circuits and utilizing the first portion of the data set, an entity model. The method further includes determining, by the one or more processing circuits, a second portion of the data set associated with a first subset of entities and determining a second subset of entities. The method further includes freezing, by the one or more processing circuits, one or more parameters associated with the second subset of entities and training, utilizing the second portion of the data set, the entity model.

20 Claims, 13 Drawing Sheets

(51) Int. Cl.
  *G06F 18/214* (2023.01)
  *G06N 3/045* (2023.01)

(56) References Cited

U.S. PATENT DOCUMENTS

| | | | | |
|---|---|---|---|---|
| 2016/0162543 | A1* | 6/2016 | Gustafson | G06F 16/2455 707/769 |
| 2018/0046721 | A1 | 2/2018 | Thornton et al. | |
| 2019/0325350 | A1 | 10/2019 | Desai et al. | |
| 2019/0332946 | A1 | 10/2019 | Han et al. | |
| 2020/0202168 | A1* | 6/2020 | Mao | G01S 7/417 |
| 2020/0320382 | A1* | 10/2020 | Burkhart | G06N 3/047 |
| 2020/0334599 | A1* | 10/2020 | Zayats | G06N 3/047 |
| 2021/0118325 | A1* | 4/2021 | Gupta | G09B 19/00 |
| 2022/0301353 | A1* | 9/2022 | Gillian | G06T 13/40 |

FOREIGN PATENT DOCUMENTS

| | | |
|---|---|---|
| KR | 10-2019-0087351 | 7/2019 |
| KR | 10-2019-0088376 | 7/2019 |

OTHER PUBLICATIONS

Ahmed et al., "Scalable Hierarchical Multitask Learning Algorithms for Conversion Optimization in Display Advertising", WSDM '14, Feb. 24-28, 2014, New York, New York (10 pages).
Epstein et al., "Joint Autoencoders: A Flexible Meta-learning Framework", ECML PKDD 2018, LNAI 11051, pp. 494-509, 2019 (16 pages).
International Search Report and Written Opinion for PCT Appln. Ser. No. PCT/US2019/063604 dated Jul. 30, 2020 (17 pages).
Segal et al., "SpamGuru: An Enterprise Anti-Spam Filtering System", IBM Thomas J. Watson Research Center, Jan. 1, 2004 (7 pages).
Yi et al., "Sampling-Bias-Corrected Neural Modeling for Large Corpus Item Recommendations", Thirteenth ACM Conference on Recommender Systems (RecSys '19), Sep. 16-20, pp. 269-277 (9 pages).
International Preliminary Report on Patentability in International Appln. No. PCT/US2019/063604, mailed on Jun. 9, 2022, 10 pages.
Office Action in Indian Appln. No. 202027036753, dated Jun. 30, 2022, 8 pages (with English translation).
Office Action in Japanese Appln. No. 2020-546153, dated Mar. 7, 2022, 6 pages (with English translation).
Epstein et al., "Joint autoencoders: A flexible meta-learning framework," Robot World Cup, dated Jan. 18, 2019, pp. 494-509.
Office Action in Korean Appln. No. 10-2020-7026087, dated Jan. 24, 2022, 4 pages (with English translation).
Office Action in Indian Appln. No. 202027036753, mailed on Jan. 18, 2024, 2 pages (with English translation).
Office Action in Chinese Appln. No. 201980017210.2, mailed on Jun. 28, 2024, 12 pages (with English translation).

\* cited by examiner

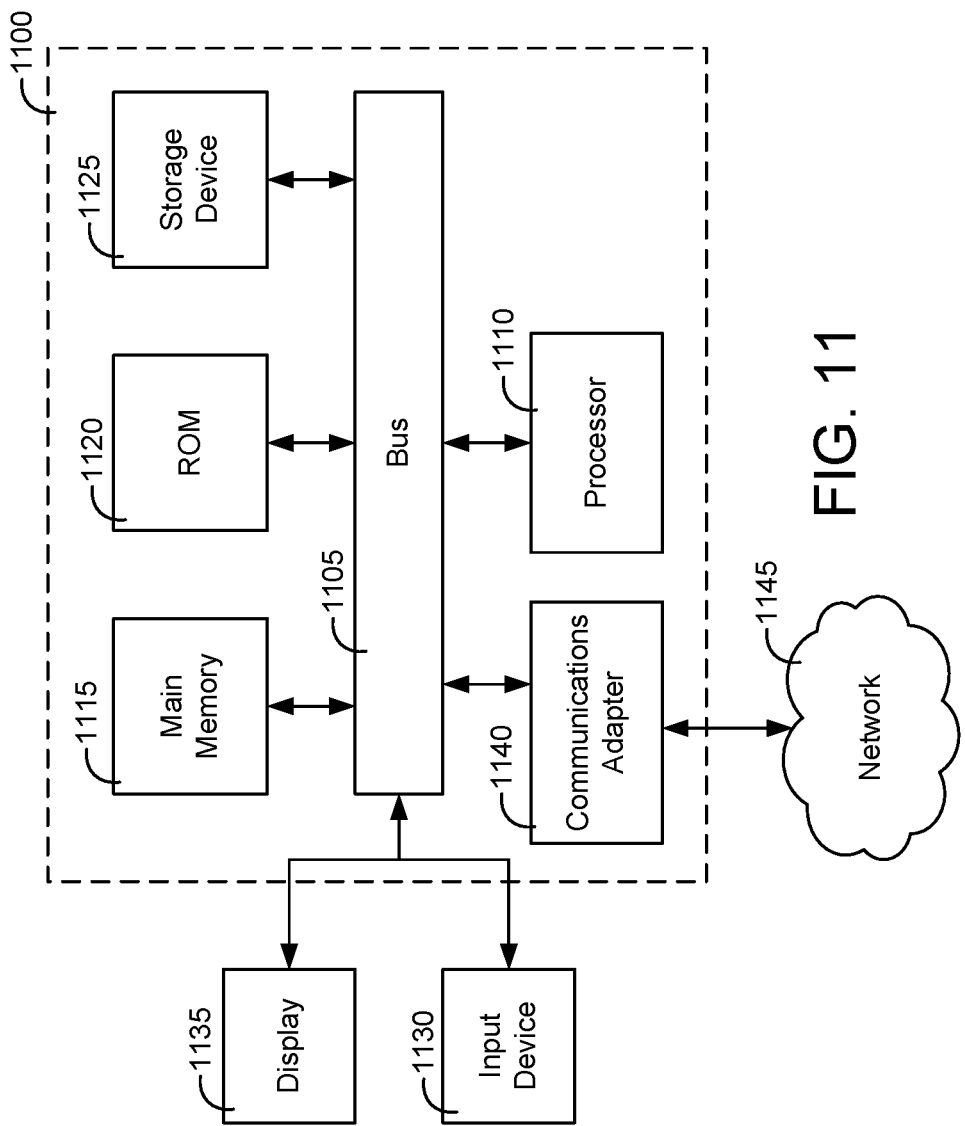

PERSONALIZED DATA MODEL UTILIZING CLOSED DATA

CROSS-REFERENCE TO RELATED APPLICATIONS

The present application is a National Stage Application, filed under 35 U.S.C. 371, of International Patent Application No. PCT/US2019/063604 filed on Nov. 27, 2019 titled "PERSONALIZED DATA MODEL UTILIZING CLOSED DATA," the entirety of which is incorporated by reference herein.

BACKGROUND

Machine learning architectures can employ one or more models to predict an output for a received input. Some machine learning models can be trained utilizing a data set. The data set can have data subsets associated with public and private data. During training of a machine learning model, the model can determine one or more parameters. Accordingly, each trained machine learning model can provide output predictions based on received input in accordance with current values of one or more parameters.

SUMMARY

Some implementations relate to a method for training of a machine-learning architecture, the method implemented by one or more processing circuits. The method includes receiving, by one or more processing circuits, a data set. Further, the method includes determining, by the one or more processing circuits, a first portion of the data set associated with a plurality of entities. Further, the method includes training, by the one or more processing circuits and utilizing the first portion of the data set, an entity model, wherein the entity model is trained to recognize one or more patterns in subsequently received data. Further, the method includes determining, by the one or more processing circuits, a second portion of the data set associated with a first subset of entities of the plurality of entities. Further, the method includes determining, by the one or more processing circuits, a second subset of entities, wherein the second subset of entities does not include any entities in the first subset of entities. Further, the method includes freezing, by the one or more processing circuits, one or more parameters associated with the second subset of entities such that the one or more parameters remain fixed during a subsequent training of the entity model and such that one or more non-frozen parameters of the trained entity model are not associated with the second subset of entities and training, by the one or more processing circuits and utilizing the second portion of the data set, the entity model.

In some implementations, the method further includes determining, by the one or more processing circuits, a third portion of the data set associated with a plurality of users, wherein the plurality of users comprises a user identifier set and a plurality of user information and training, by the one or more processing circuits and utilizing the third portion of the data set, a user model, wherein the user model is trained to recognize the one or more patterns in the subsequently received data. Further, the method includes receiving, by the one or more processing circuits, an input data set. Further, the method includes inputting, by the one or more processing circuits, the input data set into the user model and the entity model and generating, by the one or more processing circuits, an output prediction based on the trained user model and the trained entity model, wherein the output prediction is specific to the first subset of entities, and wherein the output prediction is an accuracy measurement, the accuracy measurement comprising a value. Further, generating the output prediction is further generated based on utilizing a user embedding vector generated by the user model and an entity embedding vector generated by the entity model. Further, training each of the user model and the entity model further comprises configuring at least one neural network.

In some implementations, the method further includes determining, by the one or more processing circuits, a fourth portion of the data set associated with a third subset of entities of the plurality of entities, wherein the third subset of entities does not include any entities in the first subset of entities or in the second subset of entities and training, by the one or more processing circuits and utilizing the fourth portion of the data set, a second entity model, the second entity model based on the entity model that was trained and froze utilizing the first portion of the data set. Further, the fourth portion of the data set utilized in training the second entity model does not contain any data from the second portion of the data set utilized in training the entity model.

00051 In some implementations, the first portion of the data set does not contain any data from the second portion of the data set such that each subset of the plurality of entities contains a specific data set.

In some implementations, the method further includes configuring, by the one or more processing circuits, a first neural network associated with a user model and configuring, by the one or more processing circuits, a second neural network associated with the entity model.

In some implementations, the method for training of the machine-learning architecture utilizes a two stage technique, a first stage associated with training the entity model utilizing the first portion of the data set, and a second stage associated with training the entity model utilizing the second portion of the data set.

Some implementations relate to a system with at least one processing circuit. The at least one processing circuit can be configured to receiving a data set. Further, the at least one processing circuit can be configured to determine a first portion of the data set associated with a plurality of entities. Further, the at least one processing circuit can be configured to train, utilizing the first portion of the data set, an entity model, wherein the entity model is trained to recognize one or more patterns in subsequently received data. Further, the at least one processing circuit can be configured to determine a second portion of the data set associated with a first subset of entities of the plurality of entities. Further, the at least one processing circuit can be configured to determine a second subset of entities, wherein the second subset of entities does not include any entities in the first subset of entities. Further, the at least one processing circuit can be configured to freeze one or more parameters associated with the second subset of entities such that the one or more parameters remain fixed during a subsequent training of the entity model and such that one or more non-frozen parameters of the trained entity model are not associated with the second subset of entities and train, utilizing the second portion of the data set, the entity model.

In some implementations, the at least one processing circuit further configured to determine a third portion of the data set associated with a plurality of users, wherein the plurality of users comprises a user identifier set and a plurality of user information and train, utilizing the third portion of the data set, a user model, wherein the user model is trained to recognize the one or more patterns in the subsequently received data. Further, the at least one processing circuit configured to receive an input data set. Further, the at least one processing circuit configured to input the input data set into the user model and the entity model and generate an output prediction based on the trained user model and the trained entity model, wherein the output prediction is specific to the first subset of entities, and wherein the output prediction is an accuracy measurement, the accuracy measurement comprising a value.

In some implementations, the at least one processing circuit further configured to determine a fourth portion of the data set associated with a third subset of entities of the plurality of entities, wherein the third subset of entities does not include any entities in the first subset of entities or in the second subset of entities and train, utilizing the fourth portion of the data set, a second entity model, the second entity model based on the entity model that was trained and froze utilizing the first portion of the data set. Further, the at least one processing circuit configured to determine a fifth portion of the data set associated with a fourth subset of entities of the plurality of entities, wherein the fourth subset of entities does not include any entities in the first subset of entities, in the second subset of entities, or in the third subset of entities and train, utilizing the fifth portion of the data set, a third entity model, the third entity model based on the entity model that was trained and froze utilizing the first portion of the data set.

In some implementations the first portion of the data set does not contain any data from the second portion of the data set such that each subset of the plurality of entities contains a specific data set.

Some implementations relate to one or more computer-readable storage media having instructions stored thereon that, when executed by at least one processing circuit, cause the at least one processing circuit to perform operations. The operations include receiving a data set. Further, the operations include determining a first portion of the data set associated with a plurality of entities. Further, the operations include training, utilizing the first portion of the data set, an entity model, wherein the entity model is trained to recognize one or more patterns in subsequently received data. Further, the operations include determining a second portion of the data set associated with a first subset of entities of the plurality of entities. Further, the operations include determining a second subset of entities, wherein the second subset of entities does not include any entities in the first subset of entities. Further, the operations include freezing one or more parameters associated with the second subset of entities such that the one or more parameters remain fixed during a subsequent training of the entity model and such that one or more non-frozen parameters of the trained entity model are not associated with the second subset of entities and training, utilizing the second portion of the data set, the entity model.

In some implementations, the operations further include determining a third portion of the data set associated with a plurality of users, wherein the plurality of users comprises a user identifier set and a plurality of user information and training, utilizing the third portion of the data set, a user model, wherein the user model is trained to recognize the one or more patterns in the subsequently received data. Further, the operations include receiving an input data set. Further, the operations include inputting the input data set into the user model and the entity model and generating an output prediction based on the trained user model and the trained entity model, wherein the output prediction is specific to the first subset of entities, and wherein the output prediction is an accuracy measurement, the accuracy measurement comprising a value.

In some implementations, the operations further include configuring a first neural network associated with a user model and configuring a second neural network associated with the entity model.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 11 is a block diagram of a computing system according to an illustrative implementation.

DETAILED DESCRIPTION

Figure 1A:
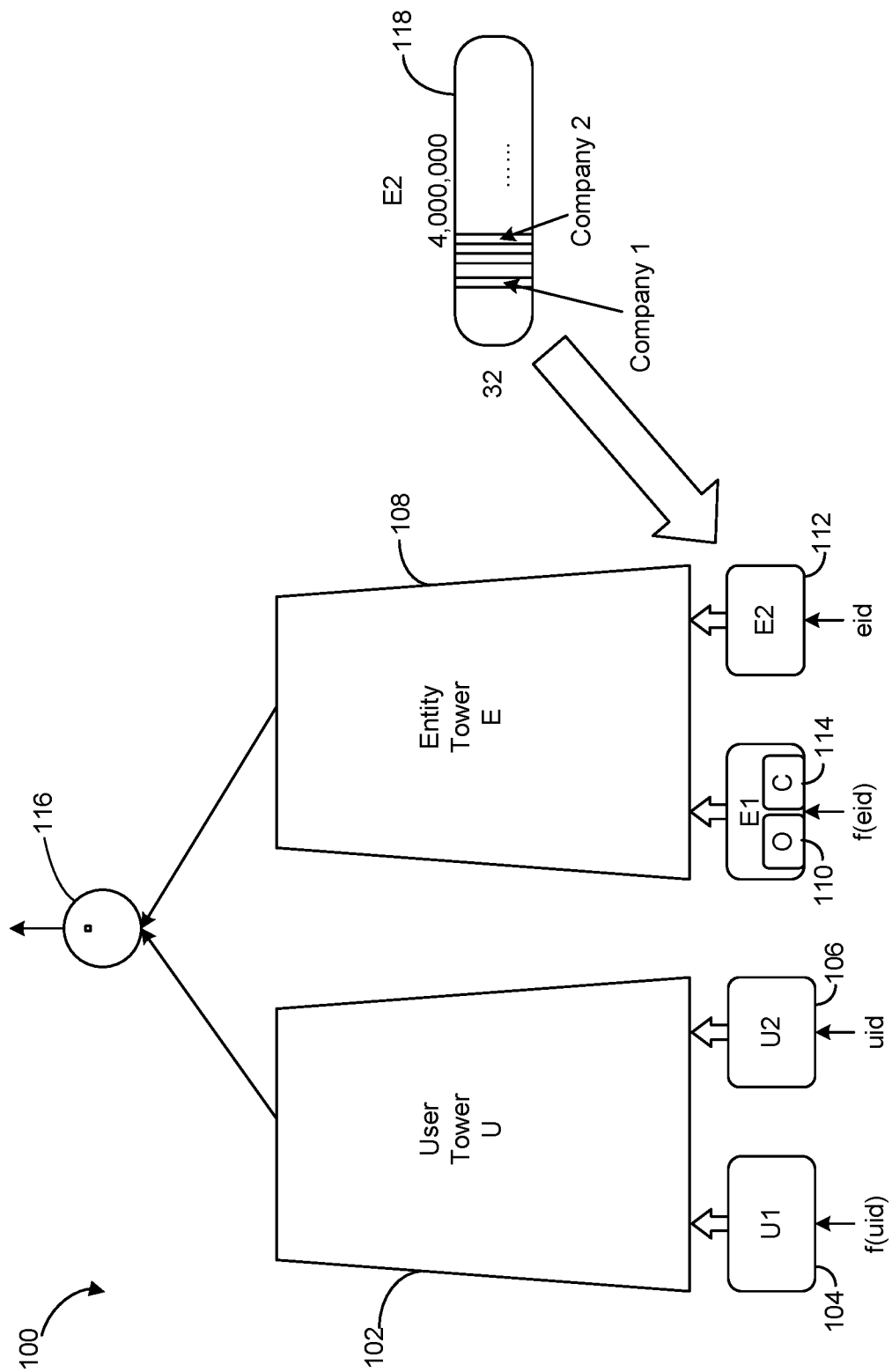
FIG. 1A is a block diagram depicting an implementation of a machine-learning architecture, according to an illustrative implementation.

The present disclosure pertains to systems and methods that relate generally to training of a machine-learning architecture. In some embodiments, the training of the machine-learning architecture can include utilizing a data set collected by one or more processing circuits to train a model. In some implementations, models are trained such that they can recognize one or more patterns in subsequently received data. The data set can comprise many subsets of data that can be utilized in training of the machine-learning architecture. In some implementations, a subset of the data set can include an open data set. The open data set can be comprised of data collected by the one or more processing circuits. For example, the data collected could include a business type (e.g., not for profit, government agency, health care provider). In various implementations, a subset of the data set can also include an closed data set. The closed data set can be associated with a plurality of identifiers and can be comprised of data received by the one or more processing circuits. For example, an identifier can include an entity identification number and the data collected could include entity specific data (e.g., customers, patients, mailing list, purchase history). In some embodiments, the entity model can be trained utilizing an open data set (e.g., a first portion of the data set). In some implementations, the entity model can be trained again utilizing a portion of a closed data set (e.g., a second portion of the data set) associated with a first subset of entities that may include a single entity. Before the training of the entity model utilizing the closed data set, a second subset of entities can be determined that do not include any entities in the first subset of entities. Further, before the training of the entity model utilizing the closed data set, one or more parameters associated with the second subset of entities can be froze such that one or more non-frozen parameters of the trained entity model are not associated with the second subset of entities. In various implementations, a user model can also be trained utilizing an open data set (e.g., a third portion of the data set).

In some systems, an open data set is the only data set utilized in the training and ultimately generating output predictions of the machine-learning architecture. However, the ability to incorporate a closed data set in the training of the machine-learning architecture, such that an output prediction can be generated based on training an open data set associated with a plurality of entities and a portion of a closed data set associated with a specific subset of entities, provides entities with enhanced output predictions that are entity specific. This approach allows machine-learning architectures to maintain the privacy of the closed data set specific to a subset of entities while providing significant improvements to their output predictions such that the accuracy of the prediction and the performance of the machine-learning architecture is improved. Therefore, aspects of the present disclosure address problems in data modelling privacy by maintaining the privacy of closed data sets (i.e., data which should not be used to train the baseline model, but which can be used to train a portion of the model that relates only to the subset of entities) utilized to generate output prediction specific to a subset of entities.

In some systems, to maintain the privacy of the closed data set such that is it not shared amongst entities, a separate closed data set model for each entity is created, such that a new personalized model would be trained that is specific to each entity. The system could then maintain the new personalized model along with an entity model and a user model. However, the ability to incorporate a portion of a closed data set in the training of the machine-learning architecture, such that an output prediction can be generated based on a user model and an entity model (e.g., baseline entity model) that only performs additional training utilizing the portion of the closed data set associated with a specific subset of entities, provides the training of the machine-learning architecture with enhanced performance and efficiency while reducing duplication throughout the models. This approach allows training of the machine-learning architectures to maintain the privacy of the portion of the closed data set specific to a subset of entities while providing efficient models that minimize duplication such that overall design of the machine-learning architecture is improved. Therefore, aspects of the present disclosure address problems in data modelling architectures by designing a data model that utilizes baseline trained models (e.g., an entity model) to generate embedding vectors specific to a subset of entities.

Accordingly, the present disclosure is directed to systems and methods for training of a machine-learning architecture such that an output prediction can be entity-specific. In some implementations, the described systems and methods involve utilizing one or more processing circuits. The one or more processing circuits allow receiving of data sets and subsequently training models based on the received data sets. The trained models can then be utilized to generate output predications such that the output predictions can be an accuracy measurement of the correlation between a specific entity and a specific user. In the present disclosure the trained models include a user model and an entity model (i.e., two tower model). In some implementations, the two tower model can provide an output prediction of "matches" between a matching pair (i.e., user/entity pair).

In some implementations, the user model is trained utilizing an open data set associated with the user (e.g., a first stage). In parallel, the entity model is trained utilizing an open data set associated with a plurality of entities (e.g., the first stage). The entity model is further trained utilizing a portion of a closed data set specific to a subset of entities (e.g., a second stage). During the training process utilizing the portion of the closed data set, one or more parameters associated with the open data set can be frozen (i.e., fixed such that they remain constant). This enables the entity model to be trained a second time (i.e., during a second stage) based on the closed data set specific to a subset of entities. Furthermore, the entity model can be saved after training utilizing the open data set such that the plurality of entities can utilize the baseline training of the entity model before training it with the closed data set associated with a specific subset of entities.

In some implementations, the trained models can be produced utilizing neural networks such that a first neural network is configured and associated with the user model and a second neural network is configured and associated with the entity model. In some implementations, a second portion of the closed data set is received such that the second portion of the closed data set is associated with a second entity. A second entity model is subsequently trained utilizing a fourth portion of the data set associated with a third subset of entities of the plurality of entities, where the third subset of entities does not include any entities in the first subset of entities or in the second subset of entities. The one or more processing circuits and utilizing the fourth portion of the data can train the second entity model and where the second entity model can be based on the entity model that was trained and froze utilizing the first portion of the data set. This can subsequently be performed with a third and a fourth entity model, each trained entity model utilizing a portion of the closed data set associated with a specific subset of entities of the plurality of entities. Furthermore, each entity model can generate embedding vectors that are specific to the subset of entities.

In situations in which the systems discussed here collects personal information about users and/or entities, or may make use of personal information, the users and/or entities may be provided with an opportunity to control whether programs or features collect user information and/or entity information (e.g., information about a user's social network, social actions or activities, profession, a user's preferences, or a user's current location), or to control whether and/or how to receive content from the content server that may be more relevant to the user and/or entity. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user and/or entity may have control over how information is collected about the user and/or entity and used by a content server.

Referring now to FIG. 1A, a block diagram of a machine-learning architecture 100 is shown, according to an illustrative implementation. The machine-learning architecture 100 is shown to include a user model 102, a user data set 104, a user identifier 106, an entity model 108, an open entity data set 110, an entity identifier set 112, a closed data set 114, an output prediction generator 116, and one or more entity specific parameters 118. In some implementations, the machine-learning architecture 100 can be implemented utilizing a machine learning algorithm (e.g., a neural network, convolutional neural network, recurrent neural network, linear regression model, sparse vector machine, or any other algorithm known to a person of ordinary skill in the art). In some implementations, the learning algorithm can take a two tower approach. The machine-learning architecture 100 can be communicably coupled to other machine-learning architectures (e.g., such as over a network 230, as described in detail with reference to FIG. 2). The machine-learning architecture 100 can have an internal logging system that can be utilized to collect and/or store data (e.g., in an analysis database 220, as described in detail with reference to FIG. 2). In various implementations, the models can be trained on a last N days data set where the last N days data set can include logs collected by the internal logging system.

In some implementations, the machine-learning architecture 100 can be executed on one or more processing circuits, such as those described below in detail with reference to FIG. 2. Referring to both FIGS. 1 and 2, the one or more processing circuits can include a microprocessor, an application specific integrated circuit (ASIC), a field-programmable gate array (FPGA), etc., or combinations thereof. The memory can include, but is not limited to, electronic, optical, magnetic, or any other storage or transmission device capable of providing processor with program instructions. The instructions can include code from any suitable computer programming language. In some implementations, the entity model 108 (i.e., tower 1) can be trained utilizing a portion of a data set that is associated with a plurality of entities such that it can recognize one or more patterns in subsequent received data. The subsequent received data can in turn be utilized to generate an embedding vector based on the plurality of entities utilized to train the model.

In some implementations, the embedding vector can be a series of floating-point values representation of a model predictions. In particular, the embedding vector can allow models to generally represent categories in the transformed space (i.e., by taking the dot product). In some implementations, the open data set 110 can be a first portion of the data set associated with previous data collected by the one or more processing circuits (e.g., stored in analysis database 220). Generally, training the entity model 108 utilizing the open data set 110 can be defined as stage 1.

In some implementations, the one or more processing circuits can receive an entity identifier set 112 (i.e., E2) and an open data set 110 (i.e., E1-O). The entity identifier set 112 can include a plurality of entity identifiers that may comprise a string of characters, numbers, and/or symbols that identify a specific entity. The open data set 110 may comprise characteristics associated with the plurality of entities of the entity identifier set 112. For example, the open data set 110 may comprise an industry type (e.g., manufacturing, retail, finance), a business size (e.g., small, middle, large), and/or a geographic region, such as a country (e.g., United States, Canada, Germany). In a particular example, the plurality of entities may be categorized as large size, manufacturing companies that are headquartered in the United States or the plurality of entities may be categorized as middle size, retail companies that are headquartered in Germany. In another example, the open data set 110 may comprise medical centers/hospitals having a trauma center level (e.g., level 1, level 2, level 3), and a bed capacity (e.g., fewer than 100 beds, 100 to 499 beds, 500 or more beds). In a particular example, the plurality of entities may be categorized as level 1 trauma centers with 500 or more beds.

In some implementations, upon receiving the open data set 110, one or more processing circuits may use the open data set 110 to train the entity model 108. Specifically, the open data set 110 can be fed as input to the entity model 108. During the training process, one or more parameters of the trained entity model 108 can be adjusted. In some implementations, once the entity model 108 is trained, the one or more processing circuits can receive input that includes an entity identifier and entity data associated with that entity identifier. After receiving the input, the one or more processing circuits can generate an entity embedding vector utilizing the entity model 108.

In some implementations, once stage 1 of training the entity model 108 is completed (i.e., baseline training), the one or more processing circuits can determine a second portion of the data set associated with a first subset of entities of the plurality of entities. Further, the one or more processing circuits can also determine a second subset of entities such that the second subset of entities does not include any entities in the first subset of entities. In some implementations, each subset of entities can contain a single entity. After determining a first and a second subset of entities, the one or more processing circuits can freeze the entity model 108. Freezing the entity model 108 can include fixing one or more parameters associated with the second subset of entities such that the one or more parameters remain fixed during a subsequent training of the entity model and such that one or more non-frozen parameters of the trained entity model are not associated with the second subset of entities. In some implementations, the frozen entity model can be stored in a storage device (e.g., data storage 209) such that the frozen entity model can be reused to reduce duplication across models and to improve storage capacity of one or more processing circuits.

In some implementations, after the training and freezing of entity model 108 is completed, the one or more processing circuits can train the entity model 108 again utilizing a portion of a data set that is associated with a specific subset of entities (i.e., the second portion of the data set associated with the first subset of entities of the plurality of entities) such that it can recognize one or more patterns in subsequent received data. In various implementations, the specific subset of entities can include a single entity. After receiving the subsequent data, the one or more processing circuits can generate a user embedding vector utilizing the entity model 108. Generally, training the entity model 108 utilizing the portion of the closed data set 114 (i.e., E1–C) can be defined as stage 2. In some implementations, a portion of the closed data set 114 is a second portion of the data set associated with previous data collected and/or received by the one or more processing circuits.

In some implementations, one or more processing circuits can receive the portion of the closed data set 114 associated with a specific subset of entities. In particular, the portion of the closed data set 114 may comprise characteristics associated with the specific subset of entities. For example, the portion of the closed data set 114 may comprise sale history by customer, a reoccurring customer list, and/or a mailing list. In a particular example, a specific entity identifier of the entity identifier set 112 may be merchant 1 and the portion of the closed data set 114 may comprise all sales in the past year, and an active mailing list. In another example, the portion of the closed data set 114 may comprise customers, and a list of their locations. In a particular example, the entity identifier may be company 1 and the portion of the closed data set 114 may comprise all their customers in the last 5 years.

Upon receiving the portion of the closed data set 114, one or more processing circuits may utilize the portion of the closed data set 114 to train the entity model 108. Specifically, the portion of the closed data set 114 can be fed as input to the entity model 108. During the training process, one or more entity specific parameters of the entity model 108 can be adjusted and stored in a portion of the one or more entity specific parameters 118. The one or more entity specific parameters can be stored in matrix such that they can be retrieved based on a specific subset of entities. In some implementations, matrix E2 is an N×M matrix of the previous data collected and/or received by the one or more processing circuits that is entity specific. In some implementations, the one or more processing circuits can convert entity specific data of matrix E2 into fixed size N embedding vectors such that each specific entity can be associated with a fixed size N embedding vector. In some implementations, matrix E2 can contain size M specific entities such that each column of matrix E2 can be entity specific data (i.e., portion of the one or more entity specific parameters 118).

In some implementations, once the entity model 108 is trained, the one or more processing circuits can receive input that includes an entity identifier and entity data associated with that entity identifier. The one or more processing circuits can then generate an embedding vector utilizing the entity model 108.

In some implementations, the entity model 108 can be implemented utilizing a machine learning algorithm such as a neural network (i.e., NN), a deep neural network (i.e., DNN), convolutional neural network (i.e., CNN), recurrent neural network (i.e., RNN), linear regression model, sparse vector machine, or any other algorithm known to a person of ordinary skill in the art. In some implementations, once stage 1 of training the entity model 108 is completed, the one or more processing circuits of can subsequently train the entity model 108 utilizing the portion of the closed data set 114 without freezing one or more parameters.

In some implementations, the one or more processing circuits can train the user model 102 (i.e., tower 2) utilizing a portion of the data set that is associated with a plurality of users (i.e., U2) such that it can recognize one or more patterns in subsequent received data. After receiving the subsequent data, the one or more processing circuits can generate a user embedding vector utilizing the user model 102. In some implementations, the user data set 104 (i.e., U1) is a third portion of the data set associated with previous data collected by the one or more processing circuits. In some implementations, one or more processing circuits can receive a user identifier set 106 and a user data set 104. The user identifier set 106 can include a plurality of user identifiers that may comprise a string of characters, numbers, and/or symbols that identify a specific entity. The user data set 104 may comprise characteristics associated with the plurality of user identifiers of the user identifier set 106. For example, the user data set 104 may comprise purchase history information, email address, internet history, and/or previous device history. In a particular example, one user identifier may be Person 1 and the user data set 104 may contain all the purchases that user made in the past 30 days, the users email address. In another example, the user data set 104 may comprise previous movies watched, stores frequently visited, and previous grocery expenditures. In a particular example, one user identifier may be Person 2 and the user data set 104 may contain all the movies watched by that user in the past week, the five most common stores that user makes purchases at, and the last 50 grocery expenditures that user made. In some implementations, the user model 102 can be user specific such that each user can possess their own user model 102. In some implementations, a specific user may possess more than one user model 102 associated with more than one user data sets (e.g., user data set 1, and user data set 2).

Upon receiving the user identifier set 106 and the user data set 104, one or more processing circuits may use the user identifier set 106 and the user data set 104 to train the user model 102. Specifically, the user identifier set 106 and the user data set 104 can be fed as input to the user model 102. During the training process, one or more parameters of the user model 102 can be adjusted. In some implementations, once the user model 102 is trained, the one or more processing circuits can receive input that includes a user identifier and data associated with that user. Utilizing the received input the one or more processing circuits can generate a user embedding vector utilizing the user model 102.

In some implementations, the entity model 108 can be implemented utilizing a machine learning algorithm such as a neural network (i.e., NN), a deep neural network (i.e., DNN), convolutional neural network (i.e., CNN), recurrent neural network (i.e., RNN), linear regression model, sparse vector machine, or any other algorithm known to a person of ordinary skill in the art. In some implementations, one or more parameters of the user model 102 can be frozen during a subsequent training.

Once the entity model 108 and the user model 102 are trained, the one or more processing circuits of the machine-learning architecture 100 can employ the entity model 108 and the user model 102 to generate output predictions based on received data. In some implementations, the output prediction can predict how likely a user will interact with a specific entity (i.e., perform a conversion). In some implementations, the generated output predictions can be generated utilizing the output prediction generator 116. In particular, given an input into the user model 102 and entity model 108 the output prediction generator 116 can take the dot product of the entity embedding vector and the user embedding vector to generate an output prediction. In some implementations, the entity embedding vector and user embedding vector can be represented as a series of floating point values. In some implementations, the entity embedding vector and the user embedding vector are normalized such that there floating point values are scaled to a variable between 0 and 1. In this regard, the dot product of the output prediction generator 116 can produce the cosine distance between the vectors that ranges from −1 (i.e., most unlikely to interact) to +1 (i.e., most likely to interact). In another implementation, the Euclidean distance can be calculated to determine interaction likelihood.

The output prediction generator 116 can be defined as:

$$\min_{\{\theta_U,\theta_E\}} \text{Loss}[U_{\theta_U}(uid, f(uid))^\circ E_{\theta_E}(eid, f(eid))], \text{opData}(uid, eid)] \quad \text{Stage 1:}$$

$$\min_{\{E_2\}} \text{Loss}[U(uid, f(uid))^\circ)E_{E_2}(eid, f(eid))], \text{clsdData}(uid, eid)] \quad \text{Stage 2:}$$

where the notations are denoted as follows:
uid: User identifier
U: User model function
$\theta_U$: Parameters associated with the user model 102
$U_{\theta_U}$(uid): User embedding vector
f(uid): User data set 104
eid: Entity identifier
E: Entity model function
$\theta_E$: Parameters associated with the entity model 108
$E_{\theta_E}$(eid): Plurality of entities embedding vector
f(eid): Open data set 104
opData(uid, eid): Interaction likelihood between user and a specific entity
Loss: Loss function (e.g., sigmoid cross entropy)
$E_{E_2}$(eid): Entity specific embedding vector
clsdData(uid, eid): Interaction likelihood between user and a specific entity As shown, stage 1 is completed after training of the user model 102 and training of the entity model 108 utilizing only the open data set 110. Also as shown, stage 2 is completed after training of the user model 102 and training of the entity model 108 utilizing the open data 110 and the portion of the closed data set 114 associated with identifiers of the specific subset of entities of the entity identifier set 112.

In some implementations, the output prediction could predict how likely user 1 is to perform a conversion (e.g., purchase an item, provide requested information, etc.) with respect to merchant X. For example, the one or more processing circuits can receive a portion of the input data set and an input identifier associated with a user. In another example, the one or more processing circuits can also receive a portion of the input data set and the identifiers of the specific subset of entities associated with that entity model 108. In this regard, the one or more processing circuits can then utilize the user model 102 and the entity model 108 to generate an embedding vector in which the output generator 116 will produce an output prediction based on how likely user 1 is to perform a conversion with respect to merchant X. Thus, output predictions could be utilized by merchant X to target specific users based on how likely a plurality of users are to perform a conversion with respect to their store. In another example, the output prediction could predict how likely patient 1 will be administered to hospital Y. In one more example, the output prediction could predict how likely user 2 will click on content item Z.

In various implementations, one or more processing circuits can train a second entity model utilizing the baseline model that was subsequently frozen (i.e., model trained utilizing the open data set 110). In some implementations, the second entity model can be an exact duplicate of the entity model 108, after its completion of stage 1. In some implementations, a different portion of the closed data set 114 is a fourth portion of the data set associated with a third subset of entities of the plurality of entities. In this regard, the second entity model can be a different entity model associated with the third subset of entities.

In some implementations, the one or more processing circuits can receive the different portion of the closed data set 114 associated with the third subset of entities. In various implementations, the third subset of entities can include a single entity. Upon receiving the different portion of the closed data set 114, one or more processing circuits may utilize the different portion of the closed data set 114 to train the second entity model. Specifically, the different portion of the closed data set 114 can be fed as input to the second entity model. During the training process, one or more third subset specific parameters of the second entity model can be adjusted (e.g., a portion of the one or more entity specific parameters 118, Company 2). In some implementations, once the second entity model is trained, the one or more processing circuits can receive input that includes an entity identifier and entity data associated with that entity identifier. The received input can then be utilized in the second entity model to generate an entity embedding vector. For example, as shown in the portions of the one or more entity specific parameters 118, Company 1 could be the one or more parameters utilized in the entity model 108, whereas Company 2 could be the one or more parameters utilized in the second entity model. In this regard, the one or more processing circuits can generate embedding vectors geared towards the first subset of entities utilizing the entity model 108 and the one or more processing circuits can also generate embedding vectors geared towards the third subset of entities utilizing the second entity model. Further, the first subset of entities could be associated with a specific entity (e.g., Company 1), and the third subset of entities could be associated with a different specific entity (e.g., Company 2). In some implementations, retraining entity model 108 can occur for a plurality of entities such that each subset of entities can generate embedding vectors geared towards each specific subset of entities.

Figure 1B:
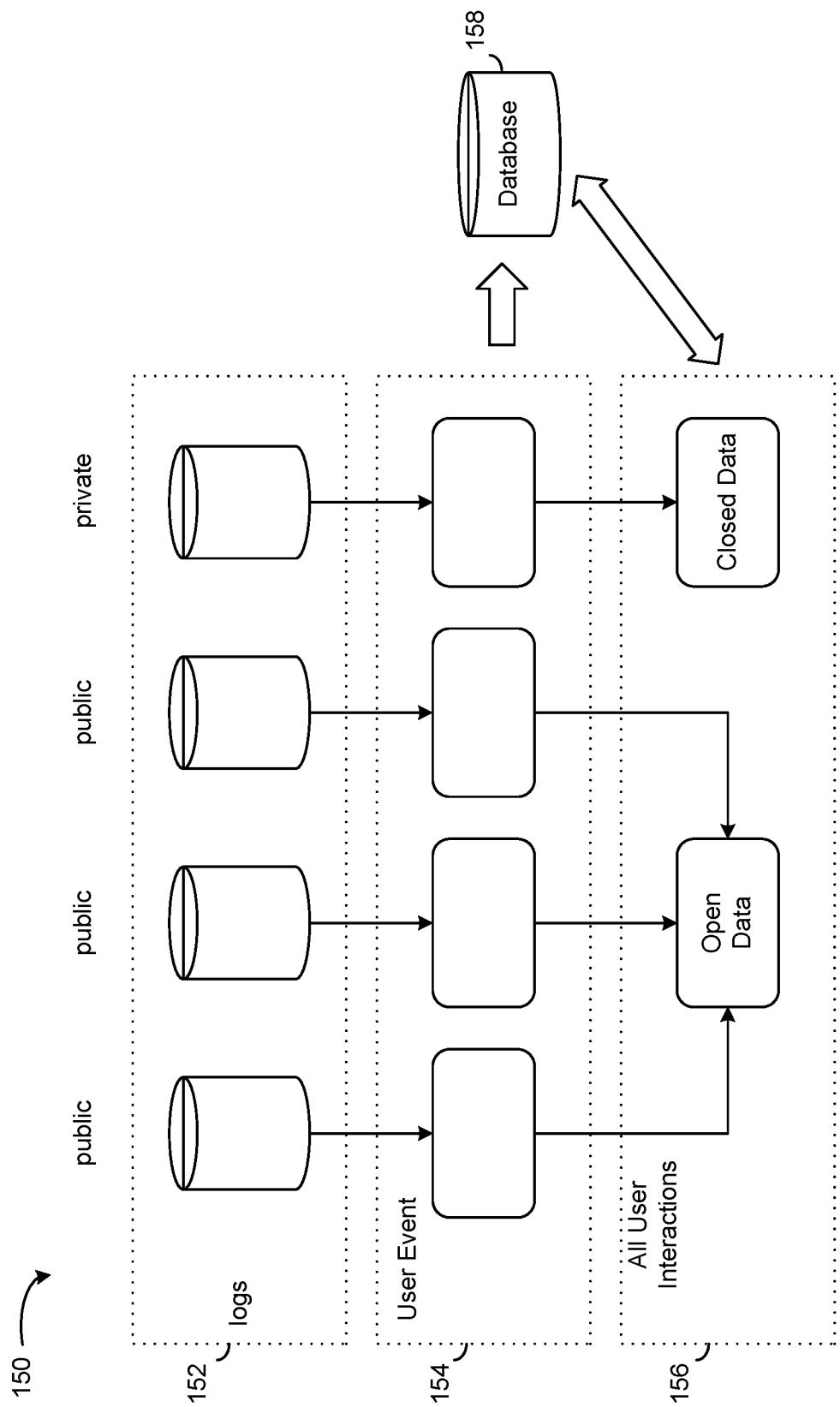
FIG. 1B is a block diagram depicting an implementation of a data collection architecture, according to an illustrative implementation.

Referring now to FIG. 1B, a block diagram of a data collection architecture 150 is shown, according to an illustrative implementation. The data collection architecture 150 is shown to include a log layer 152, a user event layer 154, an interactions layer 156, and a database 158. In some implementations, public data can be defined as data available to the public without certain limitations (e.g. open data set 110). In some implementations, private data can be defined as data that is restricted (e.g., closed data set 114). As shown, the public data flows through each layer of the model in parallel where the public data is ultimately stored in a central location such that the data can be shared without certain limitations. Also as shown, the private data flows through each layer of the model separately from the public data such that the private data is ultimately stored in a private location where the data is restricted to certain entities and/or users to prevent leaking of that data. In some implementations, each layer of the data collection architecture 150 can be configured to run on one more processing circuits (e.g., computing system 201).

In some implementations, the log layer 152 can receive data from one or more processing circuits. For example, a client device may interact with an entities website. Every time the client device interacts with the website a log can be saved and transmitted to the log layer 152. In some implementations, the log layer 152 transmits the logs it received to the user event layer 154. In some implementations, all communicate between layers or one or more processing circuits can be done over a network (e.g., network 230).

In some implementations, the user event layer 154 can determine based on the received data if an event occurred. For example, the client device purchased an item from the entities website. In another example, the client device could have subsequently called a phone number. In some implementations, the received data can be stored and categorized into a database 158. The database 158 can be utilized to provide closed data and open data to the interaction layer 156. In various implementations, the data collection architecture 150 can be communicably and operatively coupled to the database 158. The database 158 can be made up of a plurality of databases such that data can be separated based on certain properties. For example, open data could be stored in one portion of the database 158 and closed data could be stored in another portion of the database 158.

In some implementations, the interaction layer 156 may correlate data based on the user event and the received logs. For example, correlating logs that led up to a client device purchasing an items. In some implementations, the correlated data can be subsequently saved based on if it is considered private or public. In this regard, if the correlated data is considered public, the data could be stored in a public database (e.g., a portion of database 158) such that it could be utilized to a train a model based on a plurality of entities. In another example, if the correlated data is considered private, the data could be stored in a private database (e.g., a portion of database 158) such that it could be utilized to a train a model based on a specific subset of entities. In some implementations, data can be collected utilizing other architectures.

Figure 2:
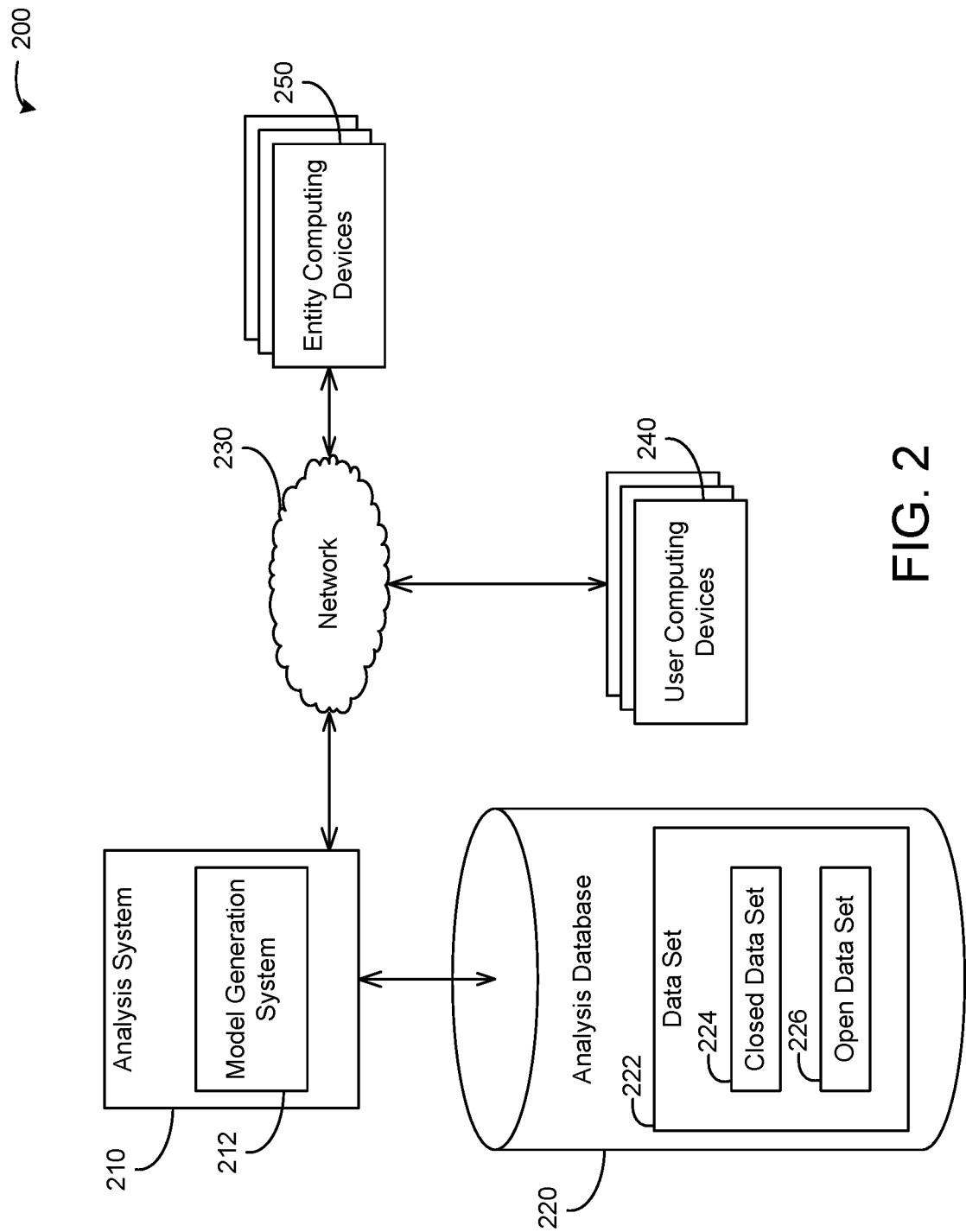
FIG. 2 is a block diagram of an analysis system and associated environment according to an illustrative implementation.

Referring now to FIG. 2, a block diagram of an analysis system 210 and associated environment 200 is shown according to an illustrative implementation. One or more user computing devices 240 may be used by a user to perform various actions and/or access various types of content, some of which may be provided over a network 230 (e.g., the Internet, LAN, WAN, etc.). A "user" used herein may refer to an individual operating user computing devices 240, and interacting with resources or content items via the user computing devices 240, etc. The user computing devices 240 may be used to send data to the analysis system 210 or used to access websites (e.g., using an internet browser), media files, and/or any other types of content. One or more entity computing devices 250 may be used by an entity to perform various actions and/or access various types of content, some of which may be provided over a network 230. The entity computing devices 250 may be used to send data to the analysis system 210 or used to access websites, media files, and/or any other types of content.

The analysis system 210 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, the analysis system 210 can be communicably and operatively coupled to the analysis database 220. The analysis system 210 can be configured to query the analysis database 220 for information and store information in the analysis database 220. In various implementations, the analysis database 220 includes various transitory and/or non-transitory storage mediums. The storage mediums may include but are not limited to magnetic storage, optical storage, flash storage, RAM, etc. The database 220 and/or the analysis system 210 can use various APIs to perform database functions (i.e., managing data stored in the database 220). The APIs can be but are not limited to SQL, ODBC, JDBC, etc.

Analysis system 210 can be configured to communicate with any device or system shown in environment 200 via network 230. The analysis system 210 can be configured to receive information from the network 230. The information may include browsing histories, cookie logs, television data, printed publication data, radio data, and/or online interaction data. The analysis system 210 can be configured to receive and/or collect the interactions that the user computing devices 240 have on the network 230. This information may be stored in a data set 222.

Data set 222 may include data collected by the analysis system 210 by receiving interaction data from the entity computing devices 250 or user computing devices 240. The data may be data input from for particular entities or users (e.g., patients, customer purchases, internet content items) at one or more points in time. The data input may include data associated with a plurality of entities, a plurality of users, a specific entity, a specific user, etc. Data set 222 may also include data collected by various data aggregating systems and/or entities that collect data. In some implementations, the data set 222 can include a closed data set 224 and an open data set 226. The closed data set 224 can be associated with a plurality of entities or plurality of users and the closed data set can associated with entity specific data or user specific data.

The analysis system 210 may include one or more processing circuits (i.e., computer-readable instructions executable by a processor) and/or circuits (i.e., ASICs, Processor Memory combinations, logic circuits, etc.) configured to perform various functions of the analysis system 210. In some implementations, the processing circuits may be or include a model generation system 212. The model generation system 212, can be configured to generate the various models and data structures from data stored in the analysis database.

Figure 3:
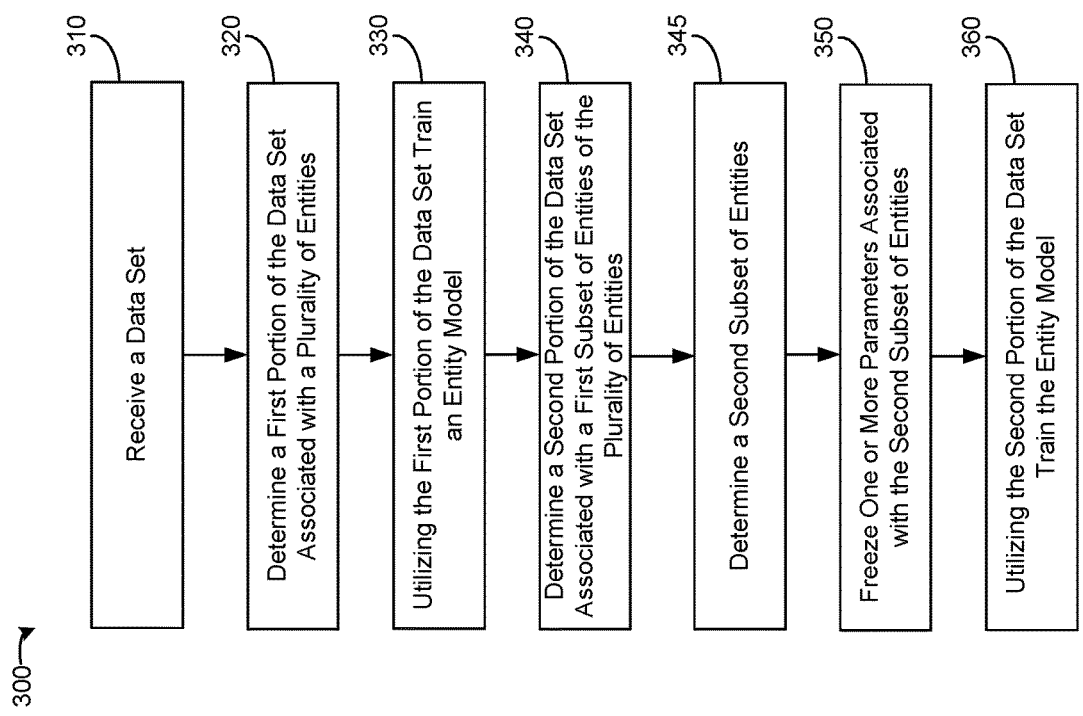
FIG. 3 is a flowchart for a method of training of a machine-learning architecture, according to an illustrative implementations.

Referring now to FIG. 3, a flowchart for a method 300 of training of a machine-learning architecture is shown, according to an illustrative implementation. The machine-learning architecture 100 can be configured to perform the method 300. Furthermore, any computing device described herein can be configured to perform the method 300.

In broad overview of the method 300, at stage 310, the one or more processing circuits receive a data set. At stage 320, the one or more processing circuits determine a first portion of the data set associated with a plurality of entities. At stage 330, the one or more processing circuits and utilizing the first portion of the data set train an entity model, wherein the entity model is trained to recognize one or more patterns in subsequently received data. At stage 340, the one or more processing circuits determine a second portion of the data set associated with a first subset of entities of the plurality of entities. At stage 345, the one or more processing circuits determine a second subset of entities, wherein the second subset of entities does not include any entities in the first subset of entities. At stage 350, the one or more processing circuits freeze one or more parameters associated with the second subset of entities such that the one or more parameters remain fixed during a subsequent training of the entity model and such that one or more non-frozen parameters of the trained entity model are not associated with the second subset of entities. At stage 360, the one or more processing circuits and utilizing the second portion of the data set train the entity model.

Referring to the method 300 in more detail, at stage 310, the one or more processing circuits receive the data set. In some implementations, the data set could include data collected from a plurality of sources. For example, the data set may be collected by the one or more processing circuits. In some implementations, the data set can be comprised of many subsets of data. In some implementations the subset of data may have distinct characteristics. For example, a subset of data could be public data that is available to all the public. In another example, a subset of data could be private data that is restricted and only available to certain entities and/or users. In some implementations, the subset of data may include certain restrictions.

At stage 320, the one or more processing circuits determine a first portion of the data set associated with a plurality of entities (e.g., open data set 110). In some implementations, the first portion of the data set can be determined based on what data can be shared across entities. For example, the first portion of the data set could be associated with a business type (e.g., not for profit, government agency, health care provider). In some implementations, the first portion of the data set does not include any identifying information about a specific subset of entities. For example, Company 1 could be a not for profit business but could also have a list of all of its donors. Thus, Company 1's not for profit business status could be included in the first portion of the data set, where the list of all its donors would not be included in the first portion of the data set.

At stage 330, the one or more processing circuits and utilizing the first portion of the data set train an entity model (e.g., entity model 108), wherein the entity model is trained to recognize one or more patterns in subsequently received data. In some implementations, the one or more patterns could be any characteristics or features associated with the first portion of the data set.

In one example, the entity model can be trained based on or more patterns associated with medical information, where the medical information can be defined as information associated with a plurality of health facilities. In this regard, the medical information could contain information about medical care administered at the plurality of health facilities with all personal identifiable information removed.

In another example, the entity model can be trained based on one or more patterns associated with suspicious transactions and fraudulent purchase data, where the transactions and/or fraudulent purchases can be defined as any report made by an individual. In this regard, a suspicious transaction and/or fraudulent purchase can include anytime an individual submits a report about a transaction or fraudulent purchase.

In some implementations, the one or more patterns could modified such that the training of the entity model could be trained based on different patterns. In one example, the entity model can be trained based on one or more patterns associated with one or more attributed conversions, where a conversion can be defined as the completion of a meaningful user action by content producer, and utilizing attributed conversions can include associating a conversion event with a content-event preceding. In this regard, an attributed conversion can include a conversion event that is preceded by a click from a client device of a content item from a content producer, it can be associated with a click-through conversion, where the conversion is then attributed to the click. In another regard, if a conversion event is preceded by an impression from a client device of a content item from a content producer, it can be associated with a view-through conversion, where the conversion is then attributed to the impression.

At stage 340, the one or more processing circuits determine a second portion of the data set associated with a first subset of entities of the plurality of entities. In some implementations, the second portion of the data set does not include any data associated with the first portion of the data set. In particular, the second portion of the data set is constructed based on data specific to the first subset of entities such that the data specific to the first subset of entities is not shared with data specific to a second subset of entities. In some implementations, the first subset of entities can be associated with a single entity. For example, Company 1 has data associated with all the products it sold in the last year (e.g., 1 billion products sold). However, Competitor Company 1 also has data associated with all the products it sold in the last year (e.g., 1 million products sold). In this example, Company 1 contains a large portion of a data that is specific to that company and should not be utilized in the baseline model (i.e., model trained utilizing the open data set 110) to generate output predictions for Competitor Company 1, and vice versa. Thus, in this example, Competitor Company 1 should not be able to take advantage of Company 1's large amounts of data to generate output predictions that could ultimately affect Company 1's profitable and/or competitive edge. Furthermore, Company 1 could expand its customer base based on the generated output predictions.

At stage 345, the one or more processing circuits determine a second subset of entities, wherein the second subset of entities does not include any entities in the first subset of entities. In some implementations, the second subset of entities can be associated with a single entity. For example, the first subset of entities can contain Company 1 and the second subset of entities can contain Company 2. At stage 350, the one or more processing circuits freeze one or more parameters associated with the second subset of entities such that the one or more parameters remain fixed during a subsequent training of the entity model and such that one or more non-frozen parameters of the trained entity model are not associated with the second subset of entities. In some implementations, freezing one or more parameters can include fixing all the parameters associated with the trained model that utilized the first portion of the data set (i.e., open data set 110).

At stage 360, the one or more processing circuits and utilizing the second portion of the data set train the entity model. In some implementations, training the entity model utilizing the second portion of the data set is completed such that an entity can obtain an entity model that generates output prediction based on the entity specific data (i.e., second portion of the data set). In this regard, training the entity model utilizing the second portion of the data set prevents model leaking of entity specific data, and thus maintain the privacy of each data set associated with each entity while producing more accurate output predictions. In some implementations, training the entity model the second time utilizing the second portion of the data set ensures certain data is kept private and not shared or utilized to make output predictions for another entity.

In the same example described above, the entity model can be trained again based on or more patterns associated with medical information associated with a specific medical facility, where the medical information could include personal identifiable information about patients. In this regard, the medical information associated with a specific patients should not be exposed to any entity (e.g., another medical facility) without patients permission. For example, a patient at the medical facility may have a medical condition that requires care from multiple doctors. The doctors within the medical facility may work together to help solve the medical condition, but without the patients permission the medical facility should not be share the medical information to any other entity and/or person.

In the same example described above, the entity model can be trained again based on one or more patterns associated with a specific financial company, where the transactions and/or fraudulent purchases can be defined as any report made by an individual directly to the specific financial company. In this regard, the transactions and/or fraudulent purchases are financial company specific such that they should not be shared with other financial companies or any other entity and an example of a suspicious transaction and/or fraudulent purchase can include anytime an individual submits a report to the specific financial company for a transaction or fraudulent purchase.

In some implementations, the one or more patterns could modified such that the training of the entity model again could be trained based on different patterns. In the same example described above, the entity model can be trained again based on one or more patterns associated with unattributed conversions, where a conversion can be defined as the completion of a meaningful user action by content producer, and the unattributed conversions are not associated with a content item impression or a content item click event. In this regard, the unattributed conversions are content producer specific such that they are not be shared with other content producer and an example of an unattributed conversion can include a purchase from a client device that was not associated with a content item impress or a content item click event.

Figure 4:
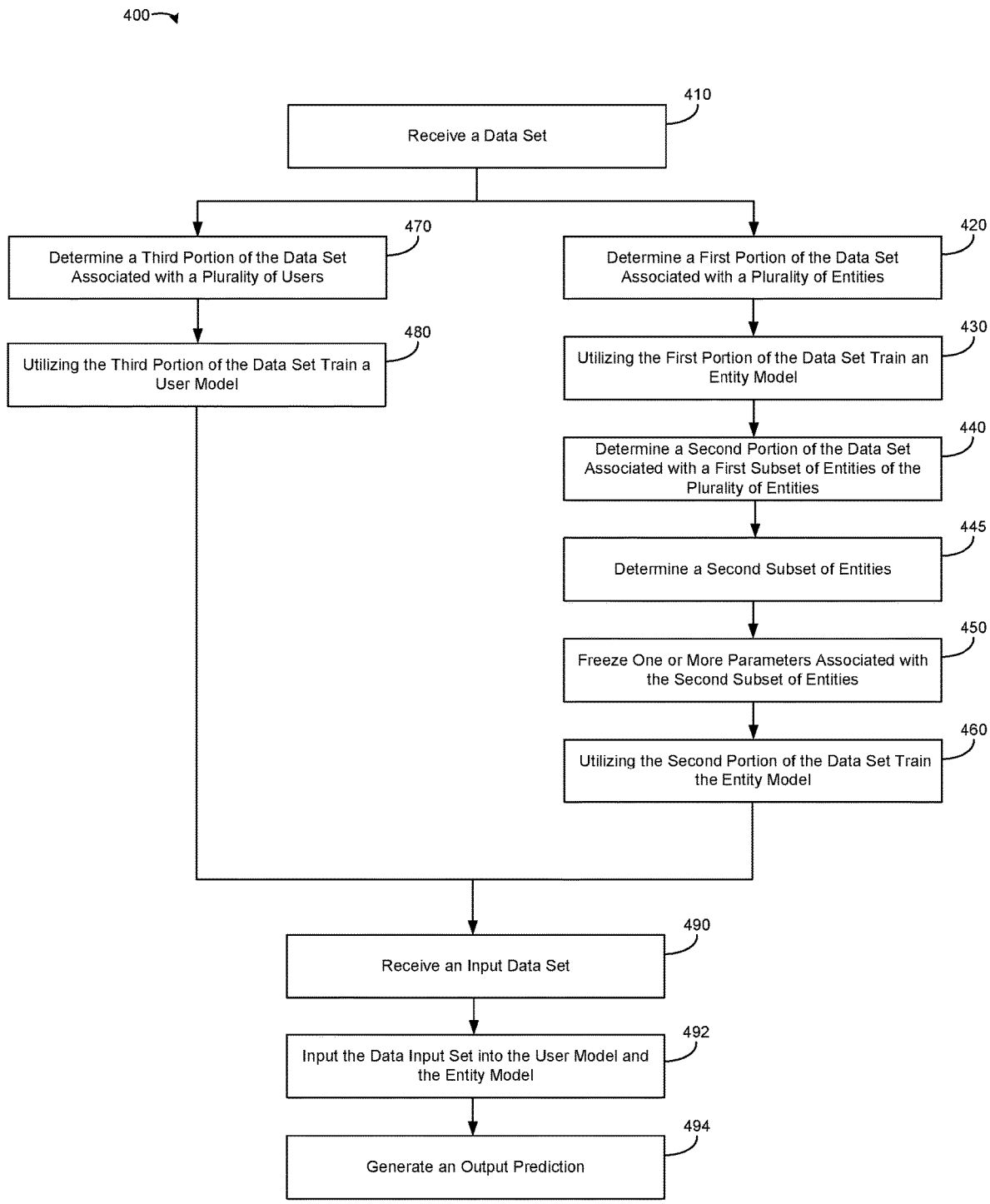
FIG. 4 is a flowchart for a method of training of a machine-learning architecture, according to an illustrative implementations.

Referring now to FIG. 4, a flowchart for a method 400 of training of a machine-learning architecture is shown, according to an illustrative implementations. The machine-learning architecture 100 can be configured to perform the method 400. Furthermore, any computing device described herein can be configured to perform the method 400. The method 400 resembles similar features and functionality, described above in detail with reference to FIG. 3.

In broad overview of the method 400, stages 410-460 are described above in detail with reference to FIG. 3, stages 310-360. However, at stage 470, the one or more processing circuits determine a third portion of the data set associated with a plurality of users. At stage 480, the one or more processing circuits and utilizing the third portion of the data set train a user model, wherein the user model is trained to recognize the one or more patterns in the subsequently received data. At stage 490, the one or more processing circuits receive an input data set. At stage 492, the one or more processing circuits input the input data set into the user model and the entity model. At stage 494, the one or more processing circuits generate an output prediction.

Referring to the method 400 in more detail, at stage 470 the one or more processing circuits determine a third portion of the data set associated with a plurality of users wherein the plurality of users comprises a user identifier set and a plurality of user information. Stage 470 resembles similar features and functionality, described above in detail with reference to FIG. 3, stage 420. However, at stage 470 the portion of the data is associated with the plurality of users.

At stage 480, the one or more processing circuits train a user model utilizing the third portion of the data set wherein the user model is trained to recognize the one or more patterns associated with the user. Stage 480 resembles similar features and functionality, described above in detail with reference to FIG. 3, stage 430. However, at stage 480 the user model is trained such that it can generate a user embedding vector associated with a prediction score based on the plurality of users utilized to train the user model (e.g., user model 102).

At stage 490, the one or more processing circuits receive an input data set. In some implementations, the input data set can have portions associated with a user identifier. In some implementations the input data can have portions associated with an entity identifier. In some implementations, the entity identifier can determine which entity model to utilize. For example, if the entity identifier is Company 1, the trained entity model that will be subsequently utilized will be the entity model trained utilizing the portion of the closed data set associated with the Company 1 entity identifier. In another example, if the entity identifier is Company 2, the trained entity model that will be subsequently utilized will be the entity model trained utilizing the portion of the closed data set associated with the Company 2 entity identifier.

At stage 492, the one or more processing circuits input the input data set into the user model and the entity model. In some implementations, the entity model utilized can be an entity specific entity model that is associated with an entity identifier. In some implementations, the entity model utilized can be a baseline entity model associated with a plurality of entity identifiers (e.g., entity identifier set 106). For example, the entity model utilized can be associated with Company M such that the output of the entity model is Company M specific. In another example, the entity model utilized can be associated with the entity identifier set 112 such that the output of the entity model is not entity specific. In this regard, Company M could utilize the entity model associated with the entity identifier set 112 but any other company other than Company M could not utilize the entity model associated with Company M. In these examples, Company M's specific data is maintained privately such that there is no model leaking (i.e., utilized by any other company).

At stage 494, the one or more processing circuits generate an output prediction based on the trained user model and the trained entity model, wherein the output prediction is specific to the first subset of entities, and wherein the output prediction is an accuracy measurement, the accuracy measurement comprising a value. Stage 494 resembles similar features and functionality, described above in detail with reference to FIG. 1A, output prediction generator 116. Furthermore, the output predictions generated can provide targeted insight and detailed demographic of entities and users.

Figure 5A:
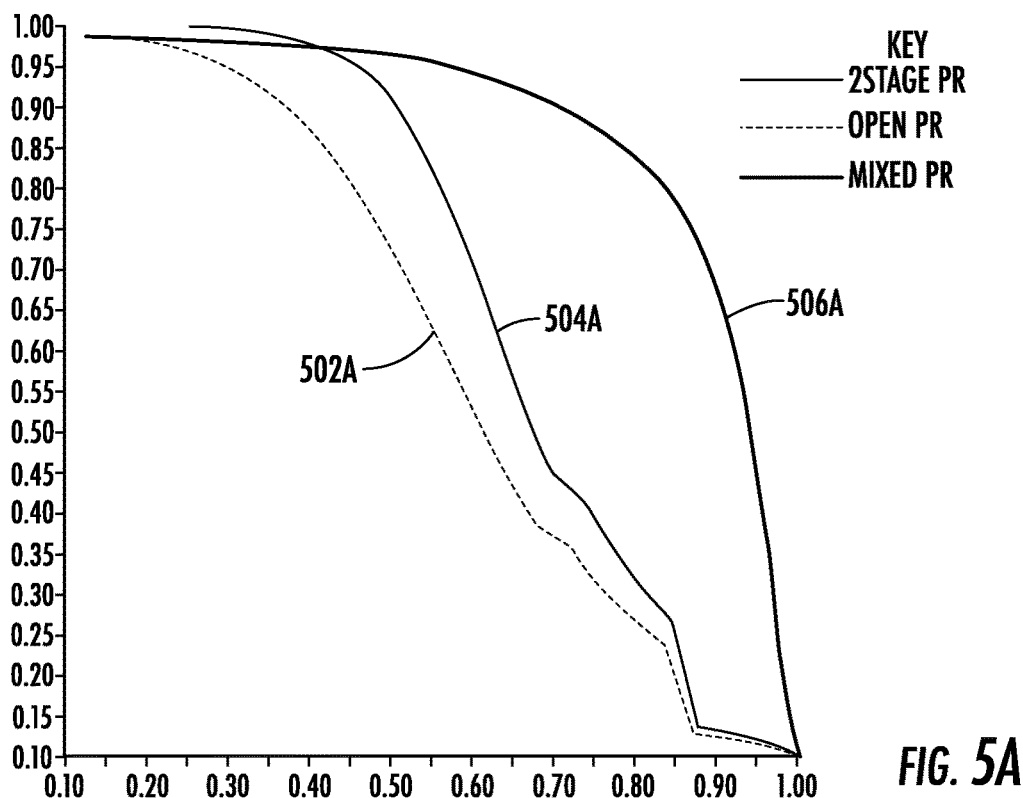
FIGS. 5A-5D are example learning curve diagrams in connection with the machine-learning architecture shown in FIG. 1A, according to a plurality of illustrative implementations.
Figure 5B:
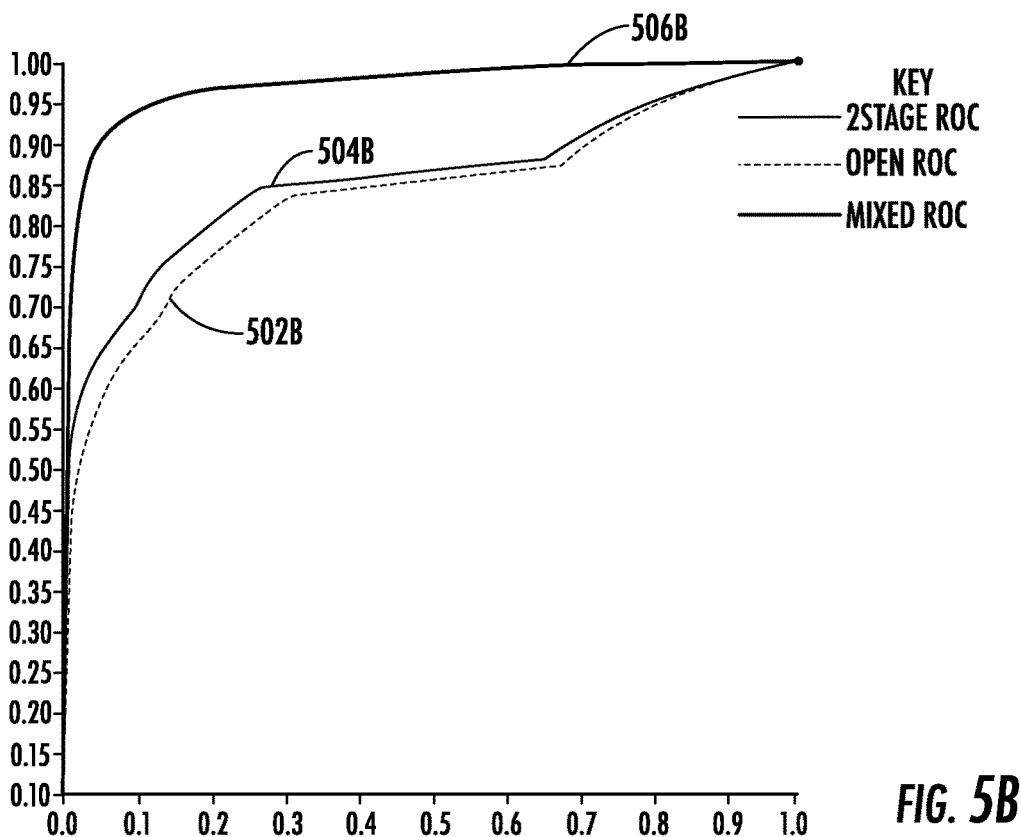
Figure 5C:
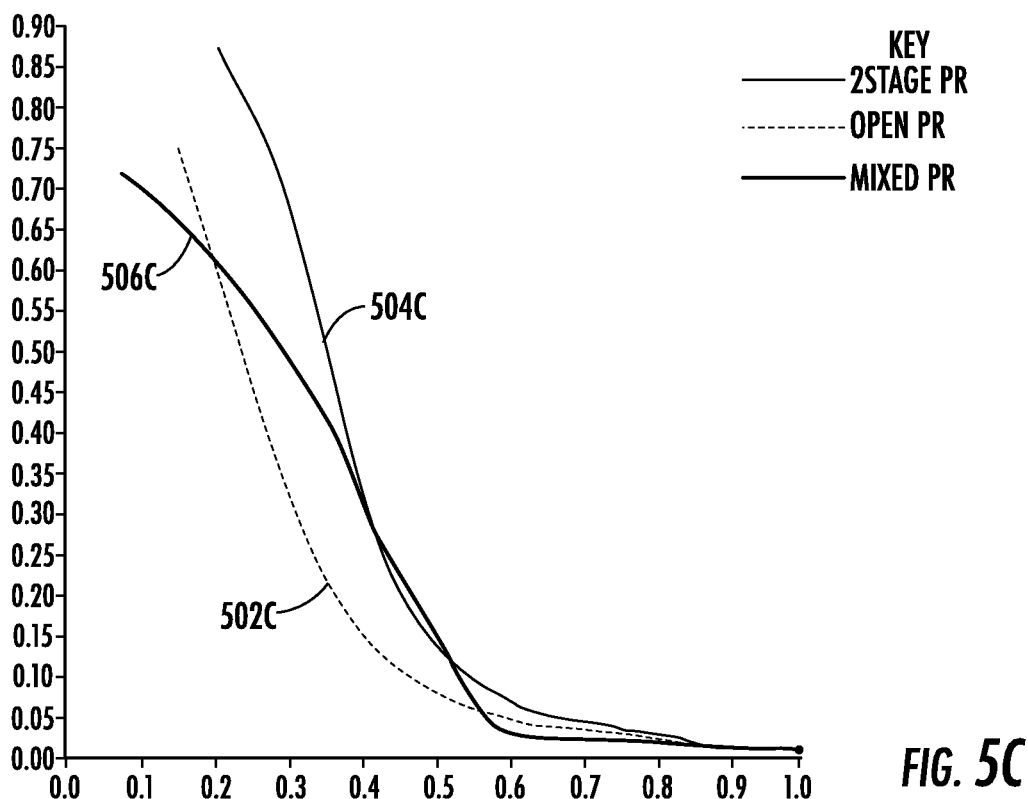
Figure 5D:
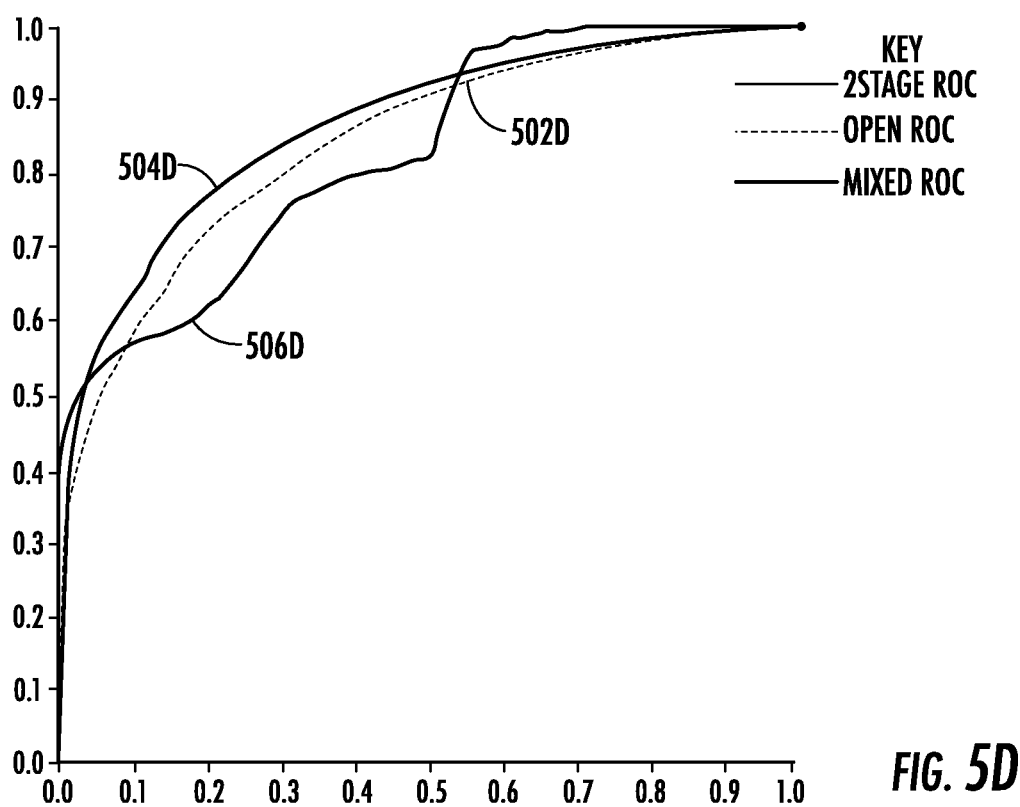

Referring now to FIGS. 5A-5D, example learning curve diagrams in connection with the machine-learning architecture 100 are shown, according to a plurality of illustrative implementations. Each of FIGS. 5A-5B are plotted based on a 1:5 true positive/false positive ratio. Each of FIGS. 5C-5D are plotted based on a 1:100 true positive/false positive ratio. In the illustrated implementation, true positives are defined as inputs into the user model 102 and entity model 108 where the models correctly predict a user has interacted with a specific entity when the user has interacted with the entity. In some implementations, false positives can be defined as inputs into the user model 102 and entity model 108 where the models predict a user has interacted with a specific entity when the user has not interacted with the entity. In some implementations, false negatives can be defined as inputs into the user model 102 and entity model 108 where the models predict a user has not interacted with a specific entity when the user has interacted with the entity.

FIG. 5A, described below is an illustrative example of a precision-recall curve. The precision-recall curve can be utilized to evaluate the skill of a trained model (e.g., user model 102, entity model 108). The precision-recall curve can be utilized to evaluate the recall (i.e., x-axis) versus the precision (y-axis). The precision-recall curve can be defined as:

$$P_{PP} = \frac{T_P}{T_P + F_P}$$

$$R = \frac{T_P}{T_P + F_N}$$

where PPP is positive predictive power, R is recall, TP is the number of true positives, FP is the number of false positives, and FN is the number of false negatives. Thus, a large area under the curve is a result of high recall and high precision (i.e., recall is a performance measure of the proportion of actual positives correctly identified, whereas precision is a performance measure of the proportion of positives correctly identified).

Thus as shown, the precision-recall curve is plotted with 3 separate lines (e.g., line 502A, line 504A, and line 506A). Line 502A is plotted utilizing the trained model after stage 1 of the machine-learning architecture 100. Line 504A is plotted utilizing the trained model after stage 1 and stage 2 of the machine-learning architecture 100. Line 506A is plotted utilizing the 3 trained model architecture, as described in detail with reference to FIG. 8. As shown, the trained model of line 504A produces significantly improved results over the trained model of 502A since the model of line 504A can more accurately predict a true positive. Also as shown, the trained model of line 504A is not able to predict the true positives as accurately as the model of line 506A. However, the trained model of line 506A has increased disadvantages since an entirely different personalized model would be required for every entity. Instead, trained model of 504A utilizes the two stage technique of the machine-learning architecture 100 where an entirely different personalized model is not required and thus, allows training of the machine-learning architecture 100 to maintain the privacy of the portions of the closed data set 114 specific to a subset of entities while providing efficient models that minimize duplication such that overall design of the machine-learning architecture is improved.

FIG. 5B, described below is an illustrative example of a receiver operating characteristic curve. The receiver operating characteristic curve can be utilized to evaluate the false positive rate (i.e., x-axis) versus the true positive rate (y-axis). The receiver operating characteristic curve can be defined as:

$$T_{PR} = \frac{T_P}{T_P + F_N}$$

where TPR is true positive rate, TP is the number of true positives, and FN is the number of false negatives. Thus, smaller values on the x-axis of the plot indicate lower false positives and higher true negatives, whereas larger values on the y-axis of the plot indicate higher true positives and lower false negatives (i.e., larger area under the curve (AUC) indicates how accurate the model is predicting when an interaction actually occurred and when an interaction actually didn't occur).

As shown, the precision-recall curve is plotted with 3 separate lines (e.g., line 502B, line 504B, and line 506B). Line 502B is plotted utilizing the trained model after stage 1 of the machine-learning architecture 100. Line 504B is plotted utilizing the trained model after stage 1 and stage 2 of the machine-learning architecture 100. Line 506B is plotted utilizing the 3 trained model architecture, as described in detail with reference to FIG. 8. As shown, the trained model of line 504A produces significantly improved results over the trained model of 502A since the model of line 504A can more accurately predict a true positive. Also as shown, the trained model of line 504A is not able to predict the true positive when the actual outcome is positive as accurately as the model of line 506A. However, as described in detail with reference to FIG. 5A, the trained model of line 504B has increased advantages over 506B. Further, as shown, FIGS. 5C-5D resemble similar features and functionality described with reference to FIGS. 5A-5B, instead utilize a 1:100 true positive/false positive ratio.

Figure 6:
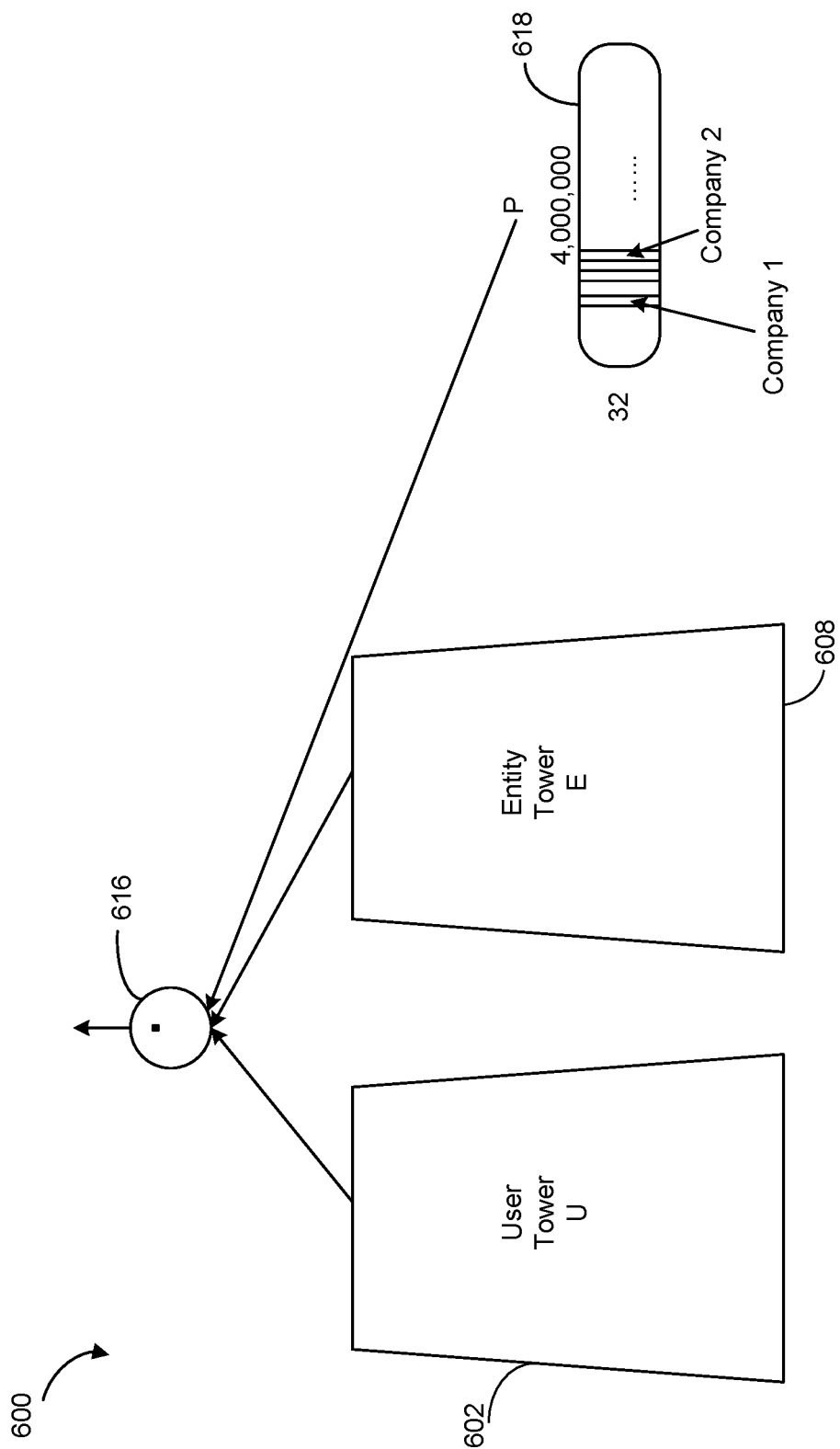
FIG. 6 is a block diagram depicting an implementation of a machine-learning architecture, according to an illustrative implementation.

Referring now to FIG. 6, a block diagram of a machine-learning architecture 600 is shown, according to an illustrative implementation. The machine-learning architecture 600 resembles similar features and functionality, described in detail with reference to FIG. 1A, in particular stage 1 of the training the models (i.e., user model 602, and entity model 608). However, in some implementations, once stage 1 of training the entity model 608 is completed (i.e., baseline training), the machine-learning architecture 600 is configured to include a personalization embedding vector. The personalized embedding vector is a portion of a subset of entity specific parameters 618 that resembles similar features and functionality, described in detail with reference to FIG. 1A, entity specific parameters 118. However, instead of retraining the entity model in stage 2 utilizing a portion of the closed data set (e.g., closed data set 114), the machine-learning architecture 600 can utilize the personalized embedding vector to directly generate output predictions. In some implementations, the machine-learning architecture 600 output prediction resembles similar features and functionality, described in detail with reference to FIG. 1A, in particular output prediction generator 116.

However the equation that defines the output prediction generator of machine-learning architecture 600 can be defined as:

$$\min_{\{\theta_U, \theta_E\}} \text{Loss}[U_{\theta_U}(uid, f(uid)) \circ E_{\theta_E}(eid, f(eid)), \text{opData}(uid, eid)] \quad \text{Stage 1:}$$

$$\min_{\{P\}} \text{Loss}[U(uid, f(uid)) \circ E(eid, f(eid)) \circ P(eid), \text{clsdData}(uid, eid)] \quad \text{Stage 2:}$$

where the notations are similar to output prediction generator 116, and the new notation is denoted as follows:

P: Personalized entity model function

In some implementations, the machine-learning architecture 600 provides similar improvements as described above with reference to FIG. 1A. In some implementations, the machine-learning architecture 600 can provide improvements to the generated output prediction since the personalized embedding vector can provide direct impact on the generated output prediction. Further, the personalized embedding vector can provide a method to evaluate the output prediction without retraining and/or adding any models.

Figure 7:
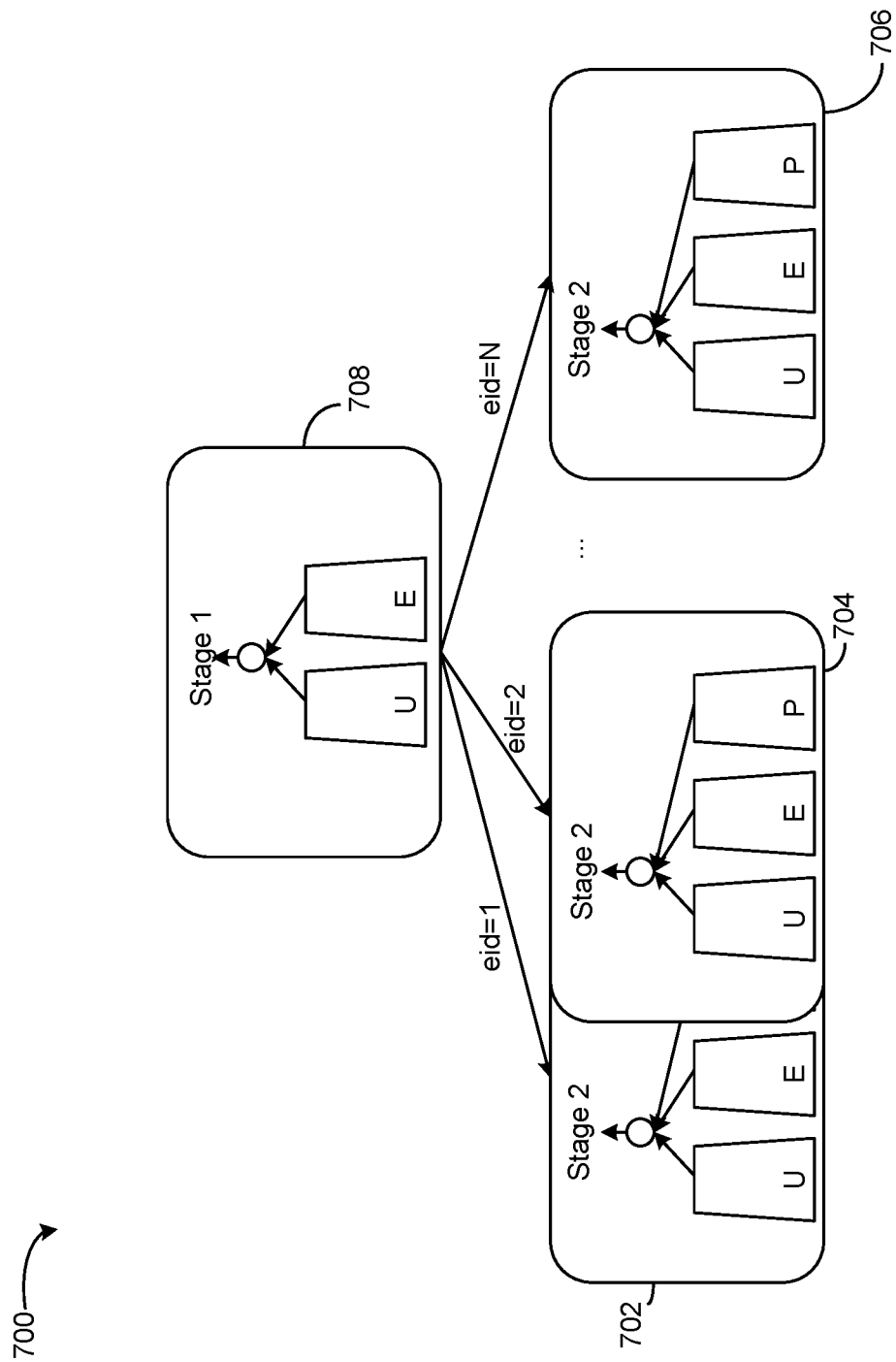
FIG. 7 is a block diagram depicting an implementation of a machine-learning architecture, according to an illustrative implementation.

Referring now to FIG. 7, a block diagram of a machine-learning architecture 700 is shown, according to an illustrative implementation. The machine-learning architecture 700 resembles similar features and functionality, described in detail with reference to FIG. 1A, in particular stage 1 of training the models. However, instead of retraining the entity model in stage 2 utilizing a different portion of the data set (e.g., entity specific portion of the closed data set 114), the machine-learning architecture 700 trains another personalized entity model (i.e., model P). In some implementations, the machine-learning architecture 700 trains the personalized entity model based on each entity such that each entity has its own individualized model (e.g., personalized architecture 702, personalized architecture 704, and personalized architecture 706).

In some implementations, once each of the models are trained (i.e., user model, entity model, and personalized model), the one or more processing circuits of the machine-learning architecture 700 can employ each model to generate output predictions based on received data. The machine-learning architecture 700 output prediction resembles similar features and functionality, described in detail with reference to FIG. 1A, in particular output prediction generator 116.

However the equation that defines the output prediction generator of machine-learning architecture 700 can be defined as:

$$\min_{\{\theta_U, \theta_E\}} \text{Loss}[U_{\theta_U}(uid, f(uid))°E_{\theta_E}(eid, f(eid)), \text{opData}(uid, eid)] \qquad \text{Stage 1:}$$

$$\min_{\{aid\}} \text{Loss}[U_{\theta_U}(uid, f(uid))°E_{\theta_E}(eid, f(eid))°P_{\theta_{eid}}(eid, uid, f(eid), f(uid)), \text{clsdData}_{eid}(uid, eid)] \qquad \text{Stage 2:}$$

where the notations are similar to output prediction generator 116, and the new notations are denoted as follows:

$P_{\theta_{eid}}$: Personalized entity model for any given entity eid
$\theta_U$: Parameters associated with the personalized entity model
clsdData$_{eid}$: Interaction likelihood between user and a specific entity In some implementations, compared to the machine-learning architecture 100, the machine-learning architecture 700 requires a greater amount of resources, whereas the machine-learning architecture 100 only requires a personalized data set (i.e., closed data set 114) that includes all the "private data" for each entity. Thus, requiring the training of 3 models instead of 2 models can be less advantages from an efficiency and maintenance standpoint.

Figure 8:
FIG. 8 is an example hidden layer representation of a neural network in connection with the machine-learning architecture shown in FIG. 1A, according to an illustrative implementation.

Referring now to FIG. 8, an example hidden layer representation 800 of a neural network in connection with the machine-learning architecture 100 is shown, according to an illustrative implementation. In some implementations, the models can be visualized such that they can provide confidence and exploration opportunity for a data pair (e.g., user/entity). In some implementations, an entity embedding vector can contain structure. For example, entities with similar verticals can be grouped together. In another example, unlike a purely vertical similarity based approach, where it can only be determined based on entities of the exactly same verticals, the entity embedding vectors locations on the example hidden layer representation 800 can be based on country and/or other factors. As shown, the example hidden layer representation 800 includes 10,000 embedding vectors. Also as shown includes a small cluster [1] and another post-like structure [2]. Thus, clusters similar to [1] and [2] can form throughout the example hidden layer representation 1100 such that predictions can be made based on the location of each entity embedding vector.

Figure 9:
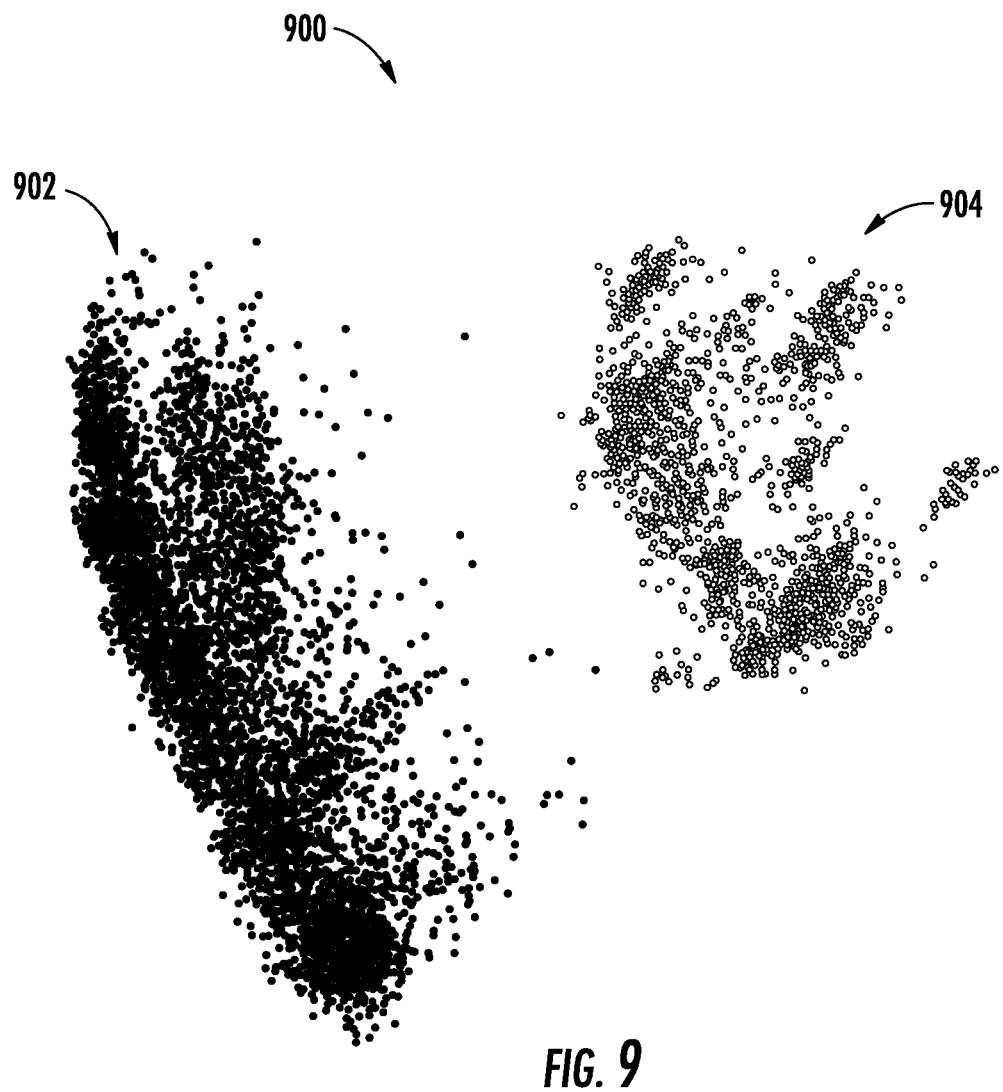
FIG. 9 is an example hidden layer representation of a neural network in connection with the machine-learning architecture shown in FIG. 1A, according to an illustrative implementation.

Referring now to FIG. 9, an example hidden layer representation 900 of a neural network in connection with the machine-learning architecture 100 is shown, according to an illustrative implementation. In some implementations, an embedding vector can contain structure such that dots grouped together can provide indications of each dots characteristics. In this example shown, the open dots located together could be entities, and the filled dots located together could be users. Thus, in this particular example, the location of the dots provide insight into a user/entity relationship. One insight could include, a particular angle the entity/user relationship is depicting. As shown, most entity/user relationships depict an obtuse angle (i.e., negative inner product), that indicates the entity/user relationship is unlikely to interact.

Figure 10:
FIG. 10 is an example hidden layer representation of a neural network in connection with the machine-learning architecture shown in FIG. 1A, according to an illustrative implementation.

Referring now to FIG. 10, an example hidden layer representation 1000 of a neural network in connection with the machine-learning architecture 100 is shown, according to an illustrative implementation. The example hidden layer representation 1000 resembles similar features and functionality, described in detail with reference to FIG. 9. However, in this example shown, the filled dots located together could be users for a given entity, the large open dot could be the given entity, and the open dots located together could be randomly sampled users. Thus, in this particular example, the location of the dots provide insight into a user/entity relationship. One insight could include, a particular angle the entity/user relationship is depicting. As shown, most entity/users for the given entity relationships depict a sharp angle (i.e., positive inner product), that indicates the entity/users for the given entity relationship is likely to interact.

FIG. 11 illustrates a depiction of a computer system 1100 that can be used, for example, to implement an illustrative user device 240, an illustrative entity device 250, an illustrative analysis system 210, and/or various other illustrative systems described in the present disclosure. The computing system 1100 includes a bus 1105 or other communication component for communicating information and a processor 1110 coupled to the bus 1105 for processing information. The computing system 1100 also includes main memory 1115, such as a random access memory (RAM) or other dynamic storage device, coupled to the bus 1105 for storing information, and instructions to be executed by the processor 1110. Main memory 1115 can also be used for storing position information, temporary variables, or other intermediate information during execution of instructions by the processor 1110. The computing system 1100 may further include a read only memory (ROM) 1120 or other static storage device coupled to the bus 1105 for storing static information and instructions for the processor 1110. A storage device 1125, such as a solid state device, magnetic disk or optical disk, is coupled to the bus 1105 for persistently storing information and instructions.

The computing system 1100 may be coupled via the bus 1105 to a display 1135, such as a liquid crystal display, or active matrix display, for displaying information to a user. An input device 1130, such as a keyboard including alphanumeric and other keys, may be coupled to the bus 1105 for communicating information, and command selections to the processor 1110. In another implementation, the input device 1130 has a touch screen display 1135. The input device 1130 can include a cursor control, such as a mouse, a trackball, or cursor direction keys, for communicating direction information and command selections to the processor 1110 and for controlling cursor movement on the display 1135.

In some implementations, the computing system 1100 may include a communications adapter 1145, such as a networking adapter. Communications adapter 1145 may be coupled to bus 1105 and may be configured to enable communications with a computing or communications network 1145 and/or other computing systems. In various illustrative implementations, any type of networking configuration may be achieved using communications adapter 1145, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. In alternative implementations, hard-wired circuitry may be used in place of or in combination with software instructions to implement illustrative implementations. Thus, implementations are not limited to any specific combination of hardware circuitry and software.

Although an example processing system has been described in FIG. 11, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, Disney+, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a smart watch, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for training of a machine-learning architecture, the method comprising:
receiving, by one or more processing circuits, a data set;
determining, by the one or more processing circuits, a first portion of the data set associated with a plurality of entities, wherein the first portion of the data set comprises an open data set including characteristics associated with the plurality of entities;
training, by the one or more processing circuits and utilizing the first portion of the data set, a machine learning entity model, wherein the machine learning entity model is trained to output predictions from subsequently received data;

determining, by the one or more processing circuits, a second portion of the data set associated with a first subset of entities of the plurality of entities, wherein the second portion of the data set comprises a closed data set specific to the first subset of entities;

determining, by the one or more processing circuits, a second subset of entities, wherein the second subset of entities does not include any entities in the first subset of entities, and wherein the second portion of the data set is not shared with the second subset of entities;

freezing, by the one or more processing circuits, one or more parameters of the machine learning entity model associated with the first portion of the data set associated with the plurality of entities such that the one or more parameters of the machine learning entity model remain fixed during a subsequent training of the machine learning entity model using the second portion of the data set and such that one or more non-frozen parameters of the trained machine learning entity model are trained to output predictions specific to the first subset of entities and are not associated with the second subset of entities; and training, by the one or more processing circuits and utilizing the second portion of the data set, the machine learning entity model.

2. The method of claim 1, further comprising:
determining, by the one or more processing circuits, a third portion of the data set associated with a plurality of users, wherein the plurality of users comprises a user identifier set and a plurality of user information; and training, by the one or more processing circuits and utilizing the third portion of the data set, a machine learning user model, wherein the machine learning user model is trained to output predictions from the subsequently received data.

3. The method of claim 2, further comprising:
receiving, by the one or more processing circuits, an input data set;

inputting, by the one or more processing circuits, the input data set into the machine learning user model and the machine learning entity model; and generating, by the one or more processing circuits, an output prediction based on the trained machine learning user model and the trained machine learning entity model, wherein the output prediction is specific to the first subset of entities, and wherein the output prediction is an accuracy measurement, the accuracy measurement comprising a value.

4. The method of claim 3, wherein generating the output prediction is further generated based on utilizing a user embedding vector generated by the machine learning user model and an entity embedding vector generated by the machine learning entity model.

5. The method of claim 2, wherein training each of the machine learning user model and the machine learning entity model further comprises configuring at least one neural network.

6. The method of claim 1, further comprising:
determining, by the one or more processing circuits, a fourth portion of the data set associated with a third subset of entities of the plurality of entities, the fourth portion of the data set comprises a closed data set specific to the third subset of entities, wherein the third subset of entities does not include any entities in the first subset of entities or in the second subset of entities; and training, by the one or more processing circuits and utilizing the fourth portion of the data set, a second machine learning entity model trained to output predictions specific to the third subset of entities, the second machine learning entity model based on the machine learning entity model that was trained and froze utilizing the first portion of the data set.

7. The method of claim 6, wherein the fourth portion of the data set utilized in training the second machine learning entity model does not contain any data from the second portion of the data set utilized in training the machine learning entity model.

8. The method of claim 1, wherein the first portion of the data set does not contain any data from the second portion of the data set such that each subset of the plurality of entities contains a specific data set.

9. The method of claim 1, further comprising:
configuring, by the one or more processing circuits, a first neural network associated with a machine learning user model; and configuring, by the one or more processing circuits, a second neural network associated with the machine learning entity model.

10. The method of claim 1, wherein the method for training of the machine-learning architecture utilizes a two stage technique, a first stage associated with training the machine learning entity model utilizing the first portion of the data set, and a second stage associated with training the machine learning entity model utilizing the second portion of the data set.

11. A system comprising:
at least one processing circuit configured to: receiving a data set;

determine a first portion of the data set associated with a plurality of entities, wherein the first portion of the data set comprises an open data set including characteristics associated with the plurality of entities;

train, utilizing the first portion of the data set, a machine learning entity model, wherein the machine learning entity model is trained to output prediction from subsequently received data;

determine a second portion of the data set associated with a first subset of entities of the plurality of entities, wherein the second portion of the data set comprises a closed data set specific to the first subset of entities;

determine a second subset of entities, wherein the second subset of entities does not include any entities in the first subset of entities, and wherein the second portion of the data set is not shared with the second subset of entities;

freeze one or more parameters of the machine learning entity model associated with the first portion of the data set associated with the plurality of entities such that the one or more parameters of the machine learning entity model remain fixed during a subsequent training of the machine learning entity model using the second portion of the data set and such that one or more non-frozen parameters of the trained machine learning entity model are trained to output predictions specific to the first subset of entities and are not associated with the second subset of entities; and train, utilizing the second portion of the data set, the machine learning entity model.

12. The system of claim 11, wherein the at least one processing circuit further configured to:
  determine a third portion of the data set associated with a plurality of users, wherein the plurality of users comprises a user identifier set and a plurality of user information; and
  train, utilizing the third portion of the data set, a machine learning user model, wherein the machine learning user model is trained to output predictions from the subsequently received data.

13. The system of claim 12, wherein the at least one processing circuit further configured to:
  receive an input data set;
  input the input data set into the machine learning user model and the machine learning entity model; and
  generate an output prediction based on the trained machine learning user model and the trained machine learning entity model, wherein the output prediction is specific to the first subset of entities, and wherein the output prediction is an accuracy measurement, the accuracy measurement comprising a value.

14. The system of claim 11, wherein the at least one processing circuit further configured to:
  determine a fourth portion of the data set associated with a third subset of entities of the plurality of entities, the fourth portion of the data set comprises a closed data set specific to the third subset of entities, wherein the third subset of entities does not include any entities in the first subset of entities or in the second subset of entities; and
  train, utilizing the fourth portion of the data set, a second machine learning entity model trained to output predictions specific to the third subset of entities, the second machine learning entity model based on the machine learning entity model that was trained and froze utilizing the first portion of the data set.

15. The system of claim 14, wherein the at least one processing circuit further configured to:
  determine a fifth portion of the data set associated with a fourth subset of entities of the plurality of entities the fifth portion of the data set comprises a closed data set specific to the fourth subset of entities, wherein the fourth subset of entities does not include any entities in the first subset of entities, in the second subset of entities, or in the third subset of entities; and
  train, utilizing the fifth portion of the data set, a third machine learning entity model trained to output predictions specific to the fourth subset of entities, the third machine learning entity model based on the machine learning entity model that was trained and froze utilizing the first portion of the data set.

16. The system of claim 11, wherein the first portion of the data set does not contain any data from the second portion of the data set such that each subset of the plurality of entities contains a specific data set.

17. One or more computer-readable storage media having instructions stored thereon that, when executed by at least one processing circuit, cause the at least one processing circuit to perform operations comprising:
  receiving a data set;
  determining a first portion of the data set associated with a plurality of entities, wherein the first portion of the data set comprises an open data set including characteristics associated with the plurality of entities;
  training, utilizing the first portion of the data set, a machine learning entity model, wherein the machine learning entity model is trained to output predictions from subsequently received data;
  determining a second portion of the data set associated with a first subset of entities of the plurality of entities, wherein the second portion of the data set comprises a closed data set specific to the first subset of entities;
  determining a second subset of entities, wherein the second subset of entities does not include any entities in the first subset of entities, and wherein the second portion of the data set is not shared with the second subset of entities;
  freezing one or more parameters of the machine learning entity model associated with the first portion of the data set associated with the plurality of entities such that the one or more parameters of the machine learning entity model remain fixed during a subsequent training of the machine learning entity model using the second portion of the data set and such that one or more non-frozen parameters of the trained machine learning entity model are trained to output predictions specific to the first subset of entities and are not associated with the second subset of entities; and
  training, utilizing the second portion of the data set, the machine learning entity model.

18. The one or more computer-readable storage media of claim 17, the operations further comprising:
  determining a third portion of the data set associated with a plurality of users, wherein the plurality of users comprises a user identifier set and a plurality of user information; and
  training, utilizing the third portion of the data set, a machine learning user model, wherein the machine learning user model is trained to output predictions from the subsequently received data.

19. The one or more computer-readable storage media of claim 18, the operations further comprising:
  receiving an input data set;
  inputting the input data set into the machine learning user model and the machine learning entity model; and
  generating an output prediction based on the trained machine learning user model and the trained machine learning entity model, wherein the output prediction is specific to the first subset of entities, and wherein the output prediction is an accuracy measurement, the accuracy measurement comprising a value.

20. The one or more computer-readable storage media of claim 17, the operations further comprising:
  configuring a first neural network associated with a machine learning user model; and configuring a second neural network associated with the machine learning entity model.

* * * * *